United States Patent
Jacques

(10) Patent No.: US 12,456,943 B2
(45) Date of Patent: Oct. 28, 2025

(54) SOLAR POWERED STREETLAMP SOLAR COLLECTOR

(71) Applicant: Jonathan Jacques, Peabody, MA (US)

(72) Inventor: Jonathan Jacques, Peabody, MA (US)

(73) Assignee: 4D Vision Corp, Peabody, MA (US)

( * ) Notice: Subject to any disclaimer, the term of this patent is extended or adjusted under 35 U.S.C. 154(b) by 88 days.

(21) Appl. No.: 18/478,266

(22) Filed: Sep. 29, 2023

(65) Prior Publication Data

US 2024/0113651 A1   Apr. 4, 2024

Related U.S. Application Data

(60) Provisional application No. 63/377,882, filed on Sep. 30, 2022.

(51) Int. Cl.
*H02S 20/20* (2014.01)
*F21S 9/03* (2006.01)
*H02S 20/32* (2014.01)

(52) U.S. Cl.
CPC ............. *H02S 20/20* (2014.12); *F21S 9/035* (2013.01); *H02S 20/32* (2014.12)

(58) Field of Classification Search
CPC .......... H02S 20/20; H02S 20/32; F21S 9/035; Y02B 20/72
See application file for complete search history.

(56) References Cited

U.S. PATENT DOCUMENTS

| | | | |
|---|---|---|---|
| 3,427,200 A * | 2/1969 | Ernest | H10F 77/488 136/246 |
| 4,224,082 A | 9/1980 | Jacobson | |
| 9,929,691 B2 | 3/2018 | Jacques | |
| 10,707,807 B2 | 7/2020 | Jacques | |
| 2008/0285265 A1 | 11/2008 | Boissevain | |
| 2009/0212570 A1 | 8/2009 | Le et al. | |
| 2010/0302764 A1 | 12/2010 | Yu et al. | |
| 2012/0143383 A1 | 6/2012 | Cooperrider et al. | |
| 2020/0109831 A1 | 4/2020 | Daghistani | |
| 2020/0333571 A1 * | 10/2020 | Jacques | H05B 45/325 |
| 2022/0128205 A1 | 4/2022 | Jacques | |

FOREIGN PATENT DOCUMENTS

| | | | |
|---|---|---|---|
| CN | 107289402 A | * 10/2017 | |
| CN | 217209169 U | 8/2022 | |
| KR | 101447254 B1 | * 10/2014 | F21S 9/03 |

OTHER PUBLICATIONS

Dong, CN107289402A, Machine Translation (Year: 2017).*
KR 101447254 B1, Machine Translation (Year: 2014).*
PCT Application No. PCT/US23/755556 International Search Report and Written Opinion dated Apr. 18, 2024, 11 pages.
U.S. Appl. No. 18/361,156, filed Jul. 28, 2023.

* cited by examiner

*Primary Examiner* — Devina Pillay
(74) *Attorney, Agent, or Firm* — Lathrop GPM LLP; Tucker Griffith

(57) ABSTRACT

Various embodiments provide a solar collecting streetlamp. The streetlamp includes a lamp top having solar collectors and one or more light sources. A post is included which supports the lamp top. Disposed around the post is a shell defining an air gap. The shell is configured to supply air from the base of the post to the lamp top. The streetlamp can include a gyromagnetic generator to help move the air through the air gap towards the lamp top.

15 Claims, 48 Drawing Sheets

⟨ Main Street 1-A
Station 1-1
Location: 40.7128° N, 74.0060° W
Status
Charge Level: '100%
Light: On
4100
Controls
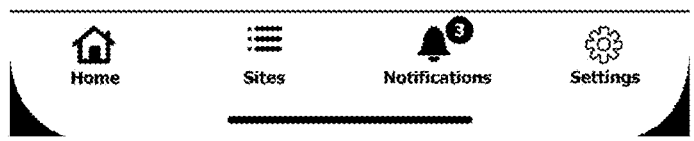
Figure 41

SOLAR POWERED STREETLAMP SOLAR COLLECTOR

STATEMENT OF RELATED INVENTIONS

This application is a U.S. Nonprovisional application which claims the benefit of U.S. Provisional Application No. 63/377,882, filed Sep. 30, 2022, and is hereby incorporated by reference in its entirety.

BACKGROUND

Various embodiments relate generally to solar panel systems and devices and, more specifically, relate to streetlamp solar collectors.

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

Solar panel systems have been described in various applications. Such applications include solar charged lamp posts, such as posts which include drone recharging stations. These applications include features of the pyramid wall system (PWS) described in U.S. patent application Ser. No. 18/361,156, filed Jul. 28, 2023, as well as features found in U.S. Patent Publication 2022/0128205, published Apr. 28, 2022; U.S. Patent Publication 2020/0333571, published Oct. 22, 2020; and U.S. Pat. No. 10,707,807, issued Jul. 7, 2020; U.S. Pat. No. 9,929,691, issued Mar. 27, 2018, the disclosures of which are incorporated by reference herein in their entirety.

SUMMARY

The below summary is merely representative and non-limiting.

The above problems are overcome, and other advantages may be realized, by the use of the embodiments.

A first aspect provides a solar collecting streetlamp. The streetlamp includes a lamp top having solar collectors and one or more light sources. A post is included which supports the lamp top. Disposed around the post is a shell defining an air gap. The shell is configured to supply air from the base of the post to the lamp top.

Another aspect provides a solar collecting streetlamp. The streetlamp includes a lamp top having a plurality of solar collectors and at least one light source and a configured to support the lamp top. The lamp top includes a ring of reflective channels configured to direct light at the plurality of solar collectors.

A further aspect provides a solar collecting streetlamp. The streetlamp includes a lamp top having a plurality of solar collectors and at least one light source. The streetlamp also includes a post configured to support the lamp top, A tilt motor configured to tilt the lamp top and a rotating motor configured to rotate the lamp top.

BRIEF DESCRIPTION OF THE DRAWINGS

Aspects of the described embodiments are more evident in the following description, when read in conjunction with the attached Figures.

FIG. 41 illustrates a station status screen for the application.

DETAILED DESCRIPTION

Various embodiments provide a solar powered streetlamp. By combining three or more smaller solar panels in an array, it is possible to generate more energy. Such results may be enhanced by more than just increasing the area in which energy is collected with the addition of various features, for example, by careful arranging the individual panels, by providing gaps between the individual panels, etc.

These solar powered streetlamps can be used provide lighting and to gather energy in locations not typically used for solar collection, such as parks, streets, lots, etc. By incorporating additional features the solar collecting elements can work more effectively than standard panels.

Figure 1:
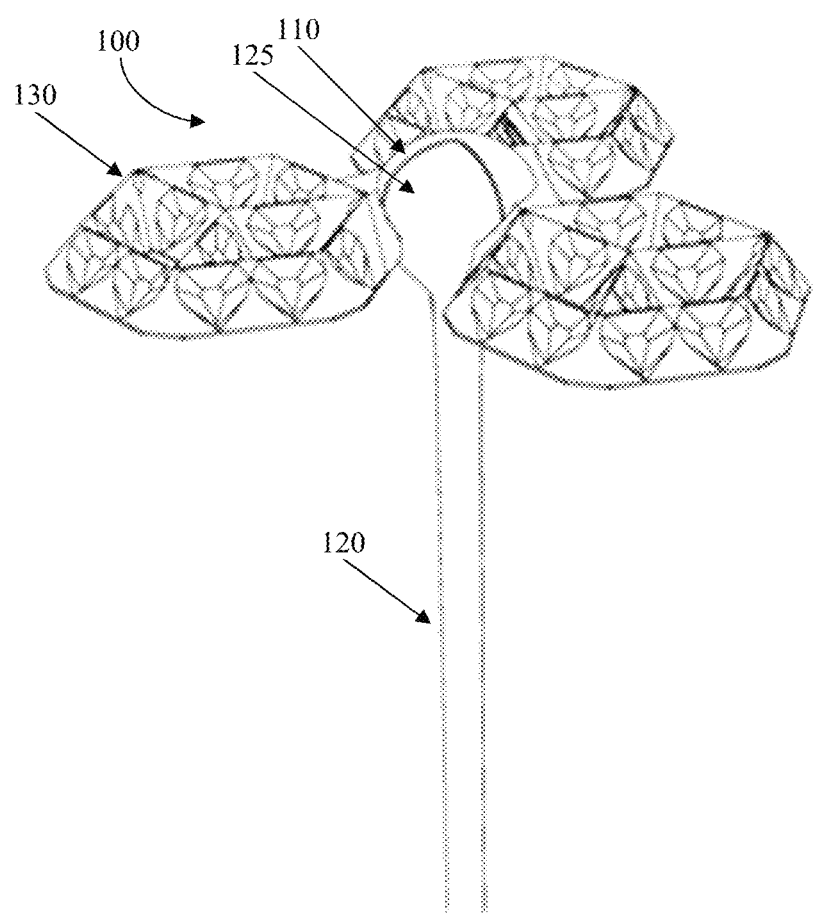
FIG. 1 shows a solar collecting lamppost.

FIG. 1 shows a solar collecting lamppost 100. The lamppost 100 includes three luminaire elements 130 which collect light and provide lighting. These luminaire elements 130 are arrayed around a central post top 125. A cover 110 is shown covering the post top 125 which can protect the post top 125 from weather. In alternative embodiments, there may be more or less luminaire elements 130, for example, two or four. As discussed below, the luminaire elements 130 may be tilted and/or rotated, for example, in order to track the sun's movement and present as many solar collected elements to the light as possible or to protect the luminaire elements 130 from inclement weather.

Figure 2:
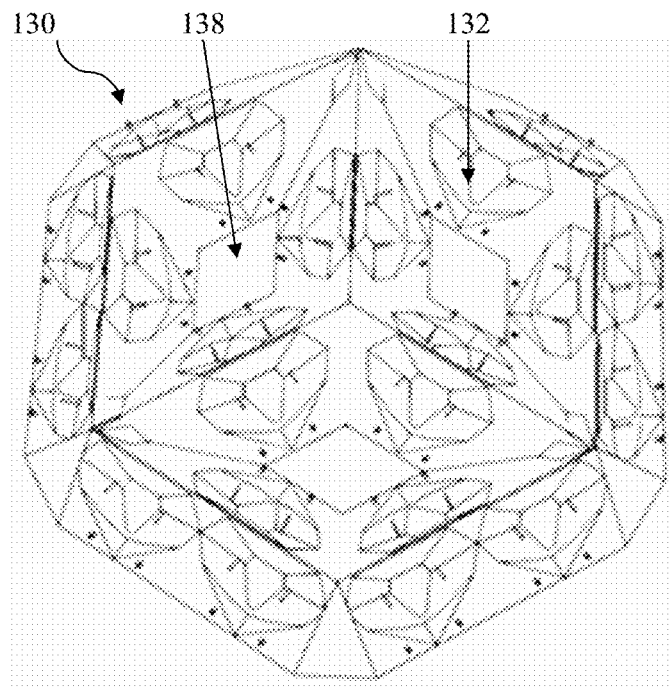
FIG. 2 shows a luminaire element of the lamppost.

FIG. 2 shows a luminaire element 130 of the lamppost 100. The luminaire element 130 features various cavities 132 and an opening 138. As demonstrated in FIG. 5, the cavities 132 are configured to have a stacked array 500 disposed above them. The surfaces of the cavity 132 and much of the luminaire element 130 may be reflective, such as with a chrome plating, so as to bounce light back at the stacked array 500 and increase the amount of light captured.

Figure 3:
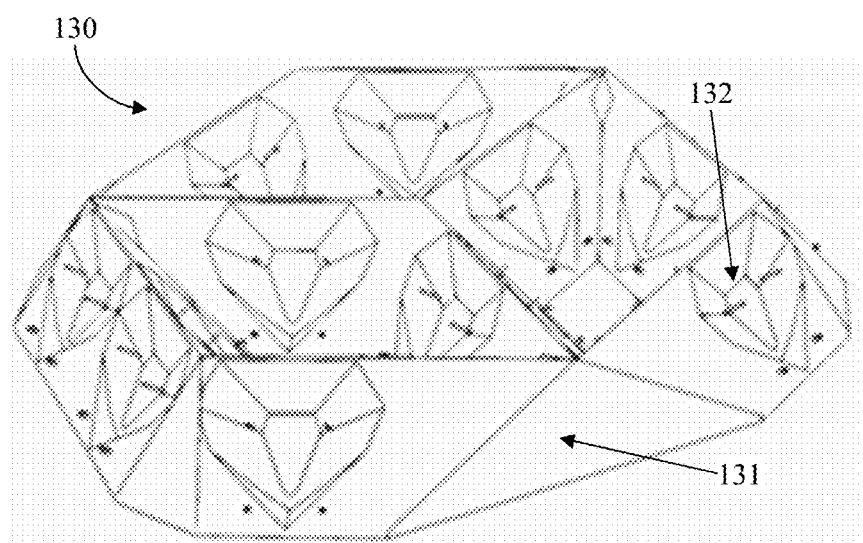
FIG. 3 shows another view of the luminaire element.

FIG. 3 shows another view of the luminaire element 130. Surface 131 is left empty of cavities 132 so as to provide a location to connect the luminaire element 130 to the lamppost 100.

Figure 4:
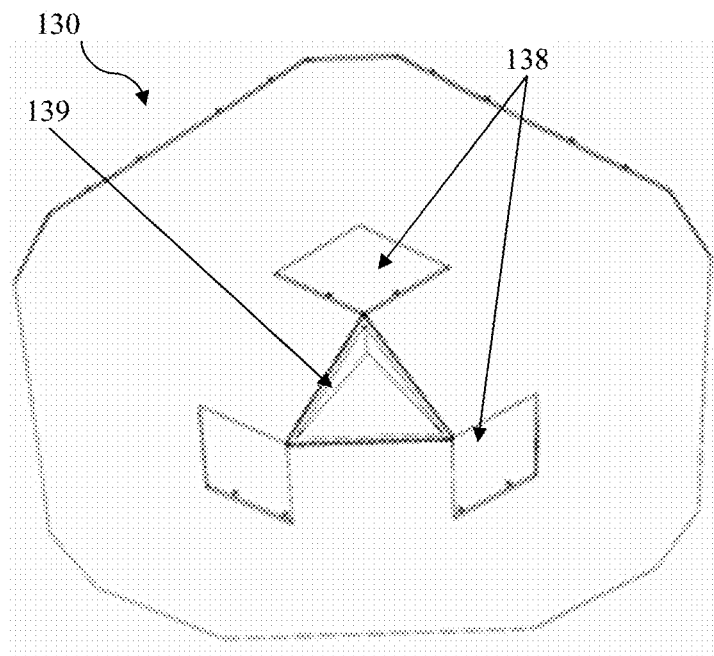
FIG. 4 shows the underside of the luminaire element.

FIG. 4 shows the underside of the luminaire element 130. As shown, the openings 138 are exposed to the underside. In some embodiments, an additional element, such as a pyramid reflector 136 (shown in FIG. 9B) may be located within the opening 138. In other embodiments, the pyramid reflector 136 may provide a pathway for liquid to drain out of the opening 138.

A lighting element 139 is located within the underside of the luminaire element 130. The lighting element 130 may be an LED or other light-producing devices. In some embodiments lighting element 130 may include LEDs of various colors so as to enable the lamppost 100 to provide an indicator, such as of an emergency. Additional lighting elements may also be disposed on the underside.

Figure 5:
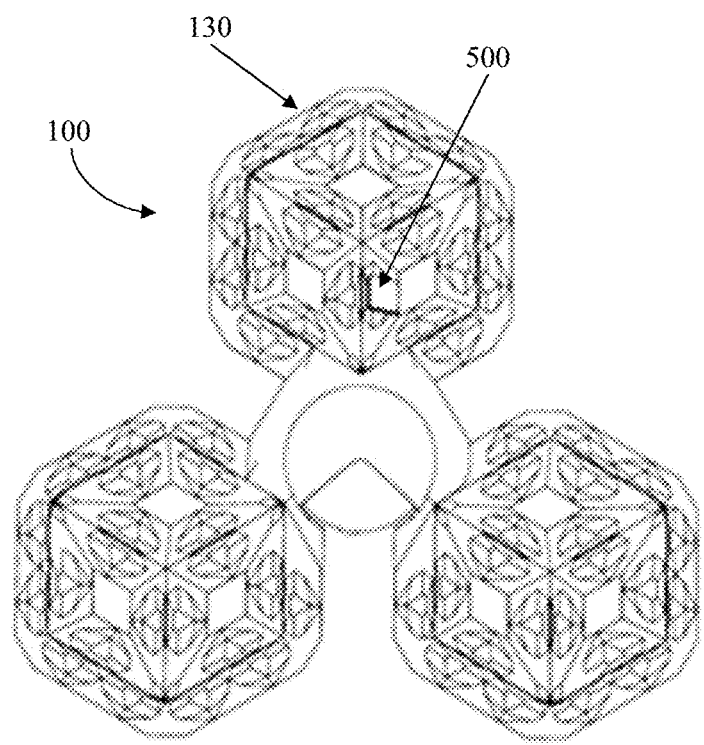
FIG. 5 shows a view of the solar collecting lamppost with a single stacked array element for demonstration.

FIG. 5 shows a view of the solar collecting lamppost 100 with a single stacked array element 500 for demonstration. The stacked array element 500 is disposed over a cavity 132 so that light incident on the surfaces of the cavity 132 is reflected onto the stacked array element 500.

Figure 6:
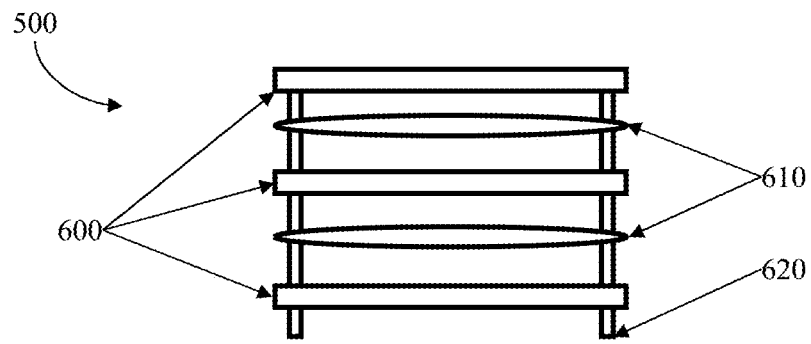
FIG. 6 shows illustrates a stacked array of tri-panel solar cell units.

FIG. 6 illustrates a stacked array 500 of tri-panel solar cell units 600. The array 500 includes three solar collecting units 600 which are separated by reflectors 610. The array 500 also includes posts 620 which hold the units 600 and reflectors 610.

Each reflector 610 is configured to reflect light in a spectrum which can be absorbed by the units 600. The reflectors 610 have curved upper and lower surfaces and may also include opening through which the posts 620 may extend.

In some embodiments, the reflectors 610 are chrome plated and/or include a treatment, coating or film which amplifies light in the IR spectrum.

The posts 620 secure the units 600 and reflectors 610 in position. Additionally, one or more of posts 620 may provide a conductive connection so that energy collected by the units 600 may be transmitted from the array 500.

The stacked array 500 may be positioned at an angle, θ, such that the element above is offset and does not fully cover the element below it. In some embodiments θ may be between 15° and 30°, such as 22.5°.

Figure 7:
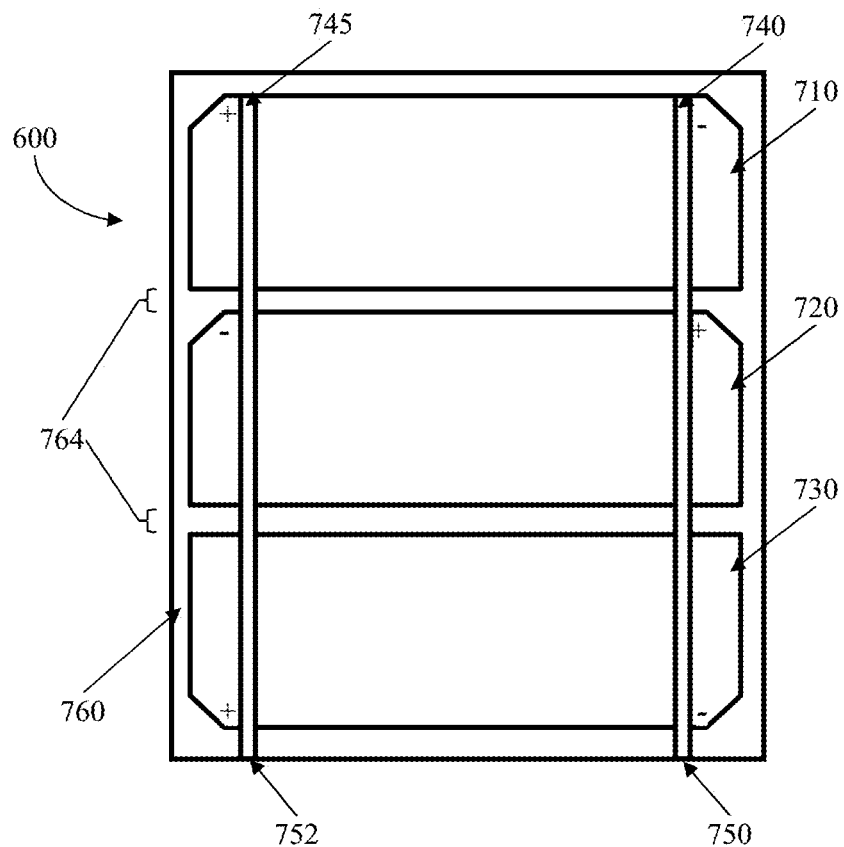
FIG. 7 shows an embodiment of a tri-panel solar cell unit.

FIG. 7 shows an embodiment of a tri-panel solar cell unit 600. The unit 600 includes three separate solar cells 710, 720, 730 (which may be half-cells). These cells 710, 720, 730 are electrically connected by conductor ribbons 740 and 745. At the base of the unit 600, the conductors 740 and 745 may include connection points 750, 752 which may be configured to be attached to another element, for example, using screws, friction fit connectors, etc.

As shown, the cells 710, 720, 730 are arranged so that cells 710 and 720 have their notches directed to the same edge (up or away from the connection points 750, 752) and cell 730 has its notches directed to the edge with the connection points 750, 752 (down). Additionally, cells 710 and 730 are oriented so that the positive connection (+) is on the right side of the unit 600.

The tri-panel solar cell unit 600 includes a casing material 760, such as glass or laminate. This material 760 is at least partially translucent to visible and/or infrared (IR) light. Gaps 764 between the cells 710, 720, 730 allow light to travel through the unit 600.

In some non-limiting embodiments, the material 760 may include a treatment, coating or film which amplifies light in the IR spectrum, for example, by converting high-frequency blue light into lower frequency red (or IR) light.

While shown as individual elements, the conductor ribbons 740 and 745 may be made of small sub-sections and may (or may not) include gaps within the length of the conductor ribbon 740 and 745.

Figure 8:
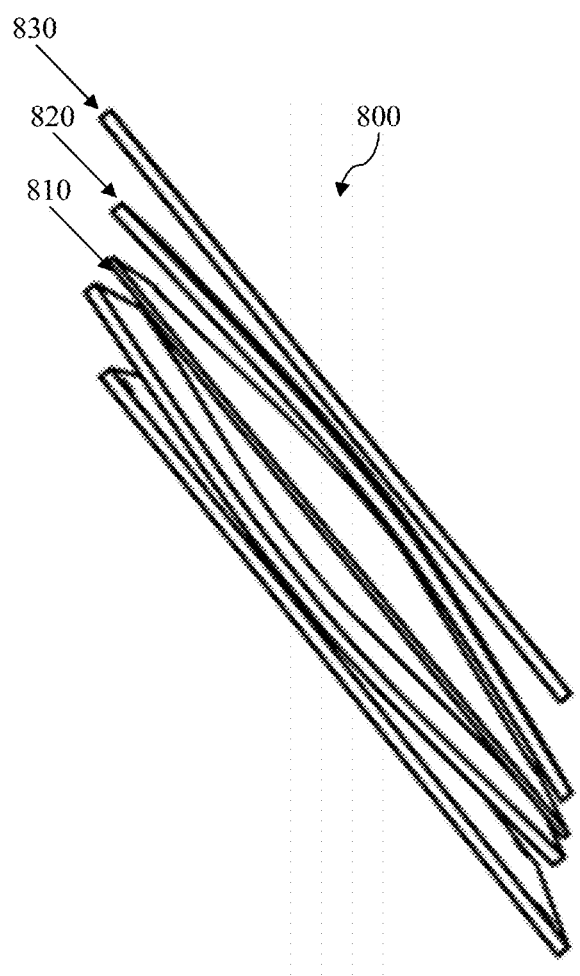
FIG. 8 shows illustrates a curved stacked array of tri-panel solar cell units.

FIG. 8 shows illustrates a curved stacked array 800 of tri-panel solar cell units 600. The array 800 includes a reflector 810 which is located between paired solar cell units 820 and 830, each of which may be a tri-panel solar cell unit 600. The inner solar cell units 820 closest to the reflector 810 may be curved away from the outer solar cell units 810. This provides a wider opening for light to enter between the solar cell units 820, 830 than if the solar cell units were parallel.

In some embodiments, the reflector 810 may include light producing elements, such as LEDs.

Figure 9A:
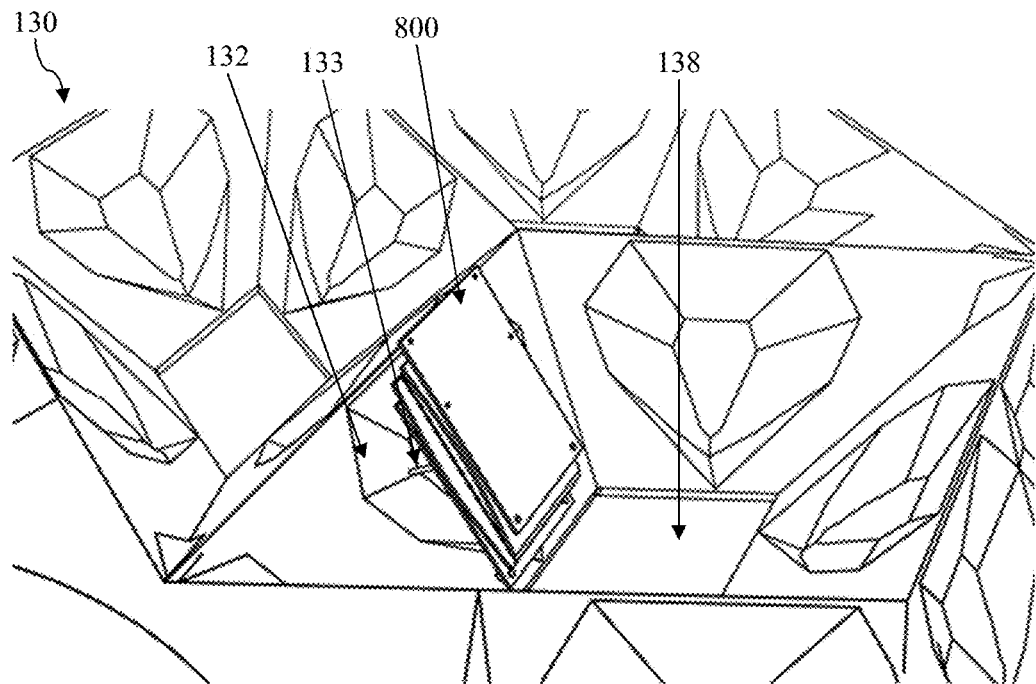
FIGS. 9A and 9B, collectively referred to as FIG. 9, show close-up views of the stacked array element in the luminaire element with (FIG. 9B) and without (FIG. 9A) a central pyramidal reflector.
Figure 9B:
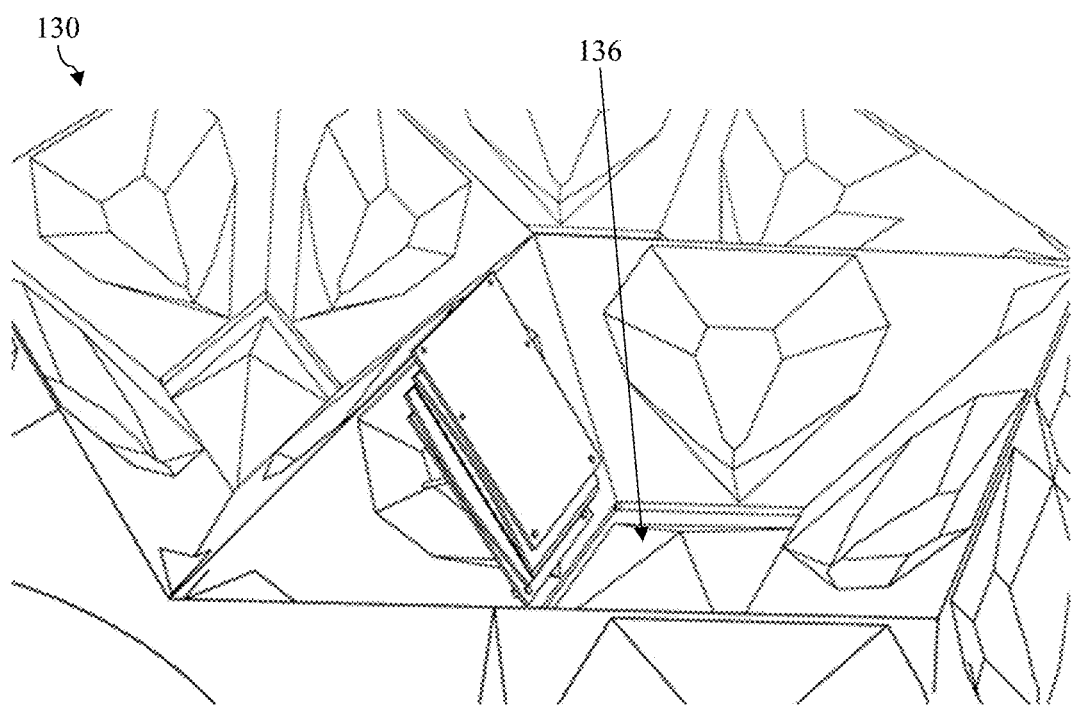

FIGS. 9A and 9B, collectively referred to as FIG. 9, show close-up views of the stacked array element 800 in the luminaire element 130 with (FIG. 9B) and without (FIG. 9A) a central pyramidal reflector 138. As shown above, the array element 800 is located over a cavity 132. Posts 133 secure the array element 800 in place and may provide a conductive path for energy collected by the array element 800.

The central pyramidal reflector 138 may also be configured to produce a spoiler effect so that wind blowing over the luminaire elements 130 does not create excess force and damage the lamppost 100.

The various light producing elements may be configured to produce light in the IR spectrum and/or in a visible spectrum. In some embodiments, the LEDs may be located in the pyramidal reflect 430, in the sides 420 and/or in the reflectors 310.

Figure 10:
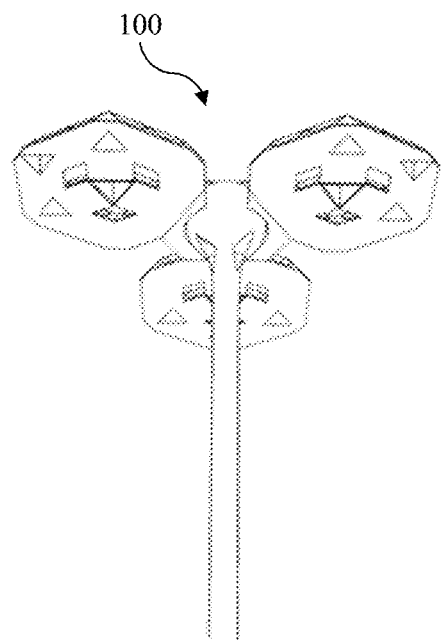
FIG. 10 shows the underside of the solar collecting lamppost.
Figure 11:
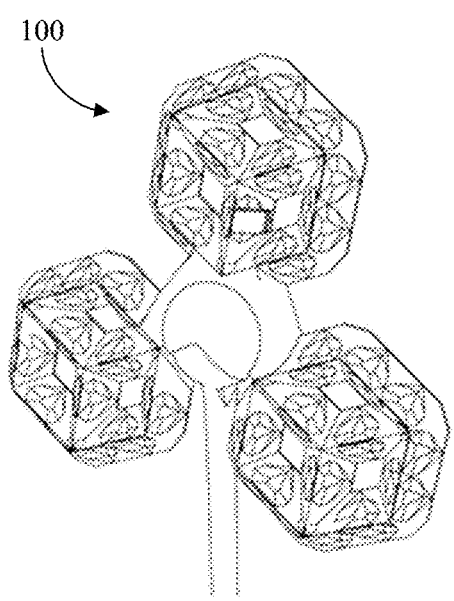
FIG. 11 shows the solar collecting lamppost rotated 90°.
Figure 12:
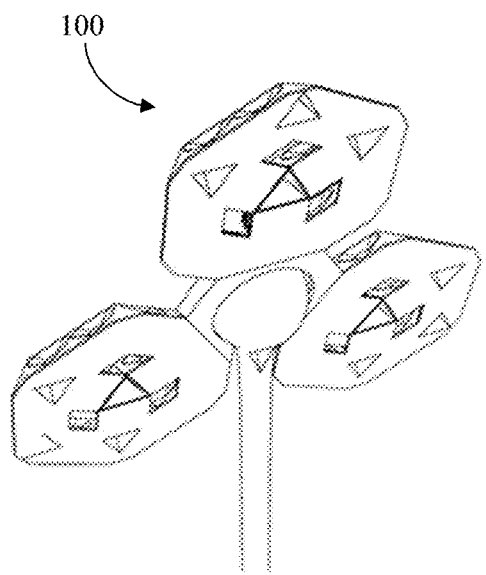
FIG. 12 shows the solar collecting lamppost rotated 45°.
Figure 13:
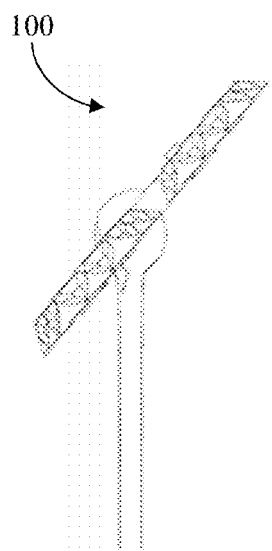
FIG. 13 shows another view of the solar collecting lamppost rotated 45°.

FIG. 10 shows the underside of the solar collecting lamppost 100 when held parallel to the ground. FIG. 11 shows the solar collecting lamppost rotated 90°. FIG. 12 shows the solar collecting lamppost rotated 45°. FIG. 13 shows another view of the solar collecting lamppost rotated 45°.

The lamppost 100 may include various detectors, such as a wind sensor, light sensor, thermometer, etc. so as to ascertain the current weather conditions. Computer logic located in the lamppost 100, or remotely, may use that information to instruct the lamppost 100 to rotate/tilt the luminaire elements 130 so as to gather additional light or to protect them from the wind.

Lamppost 100 may also include communication elements, such as an RF transmitter, to send and receive signals, e.g., to provide data regarding current weather conditions, indicate error conditions, receive rotation instructions, etc.

Figure 14:
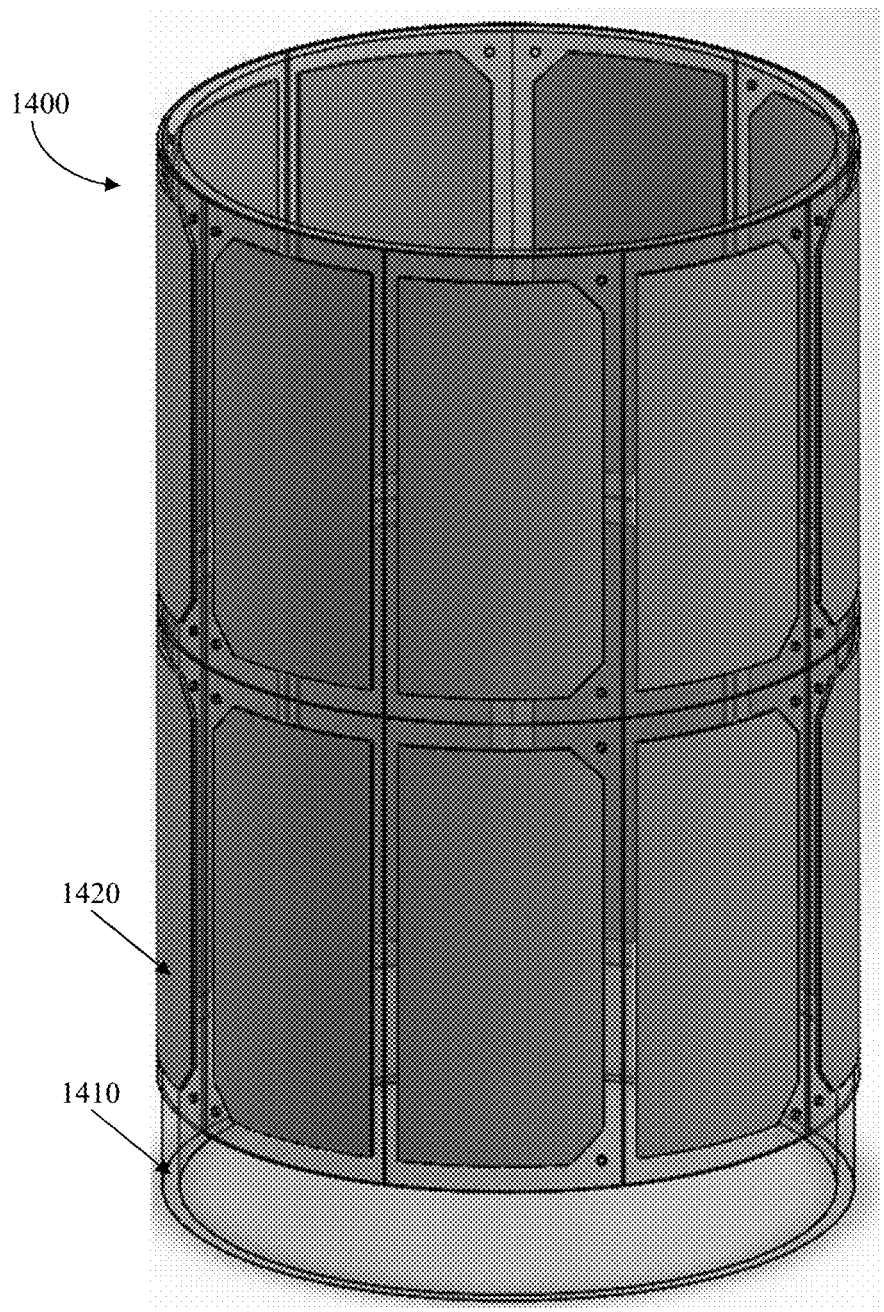
FIG. 14 shows a post cylinder element.

FIG. 14 shows a post cylinder element 1400. The cylinder element 1400 includes a transparent body 1410 which houses multiple solar collectors 1420. The solar collectors 1420 may be arranged in a similar manner as the tri-panel solar cell units 600. The cylinder element 1400 is positioned around the post 120 and provides additional surface area for receiving light.

The multiple solar collectors 1420 may include two, back-to-back solar panels so that light may pass through the transparent body 1410, reflect off the post 100 and be collected by the solar collectors 1420.

Figure 15:
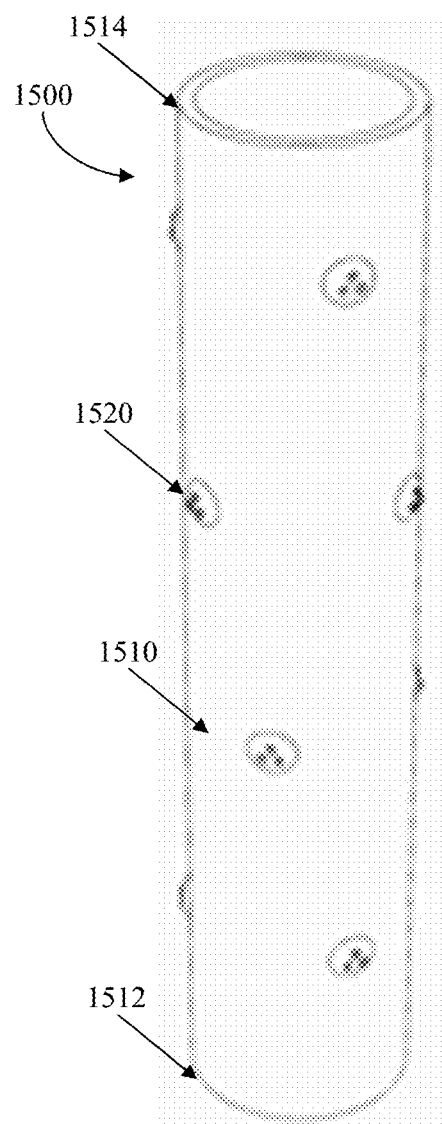
FIG. 15 shows another embodiment of a post.

FIG. 15 shows another embodiment of a post 1500. As shown the post 1500 features a reflective body 1510 and has multiple lighting elements 1520 located along the body 1510. In this non-limiting embodiment, the lighting elements 1520 include 3 LED lights.

The body 1510 extends from the bottom 1512 to the top 1514. In some embodiments, the post 120 is configured to taper from a wider base 1512, e.g., 10 inches to a narrower top 1514, e.g., 6 inches. In other embodiments, the post may taper from 24 inches to 16 inches.

Figure 16:
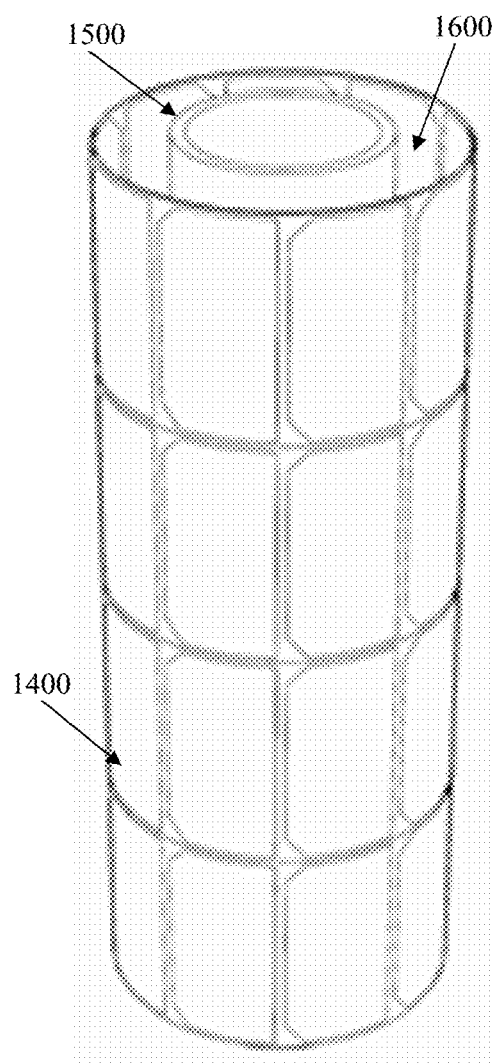
FIG. 16 shows a post cylinder element located around the post.

FIG. 16 shows a post cylinder element 1400 located around the post 1500. The cylinder element 1400 may include openings located near the top and the bottom of the lamppost 100. This allows cooler air near the ground to enter a gap 1600 between the post 120 and the cylinder element 1400 and be drawn upwards in order to help cool the cylinder element 1400.

In alternative embodiments, individual LED elements may be replaced with a combination of LEDs, such as those used for lighting the solar collectors. Each LED may provide light with an associated spectrum which may differ from that of the others, for example, one LED may provide more light in the IR range while a second LED provides light in the visible range. These combinations of LEDs may include two, three or more individual elements.

A cover (not shown) may be located over the luminaire element 130. The cover may be flat, dimpled, concave, convex or otherwise shaped. The cover may also include a treatment, coating or film which amplifies light in a given spectrum, such as IR. In some embodiments, the transparent body 1410 also includes a treatment, coating or film which amplifies light in a given spectrum, such as IR.

Figure 17:
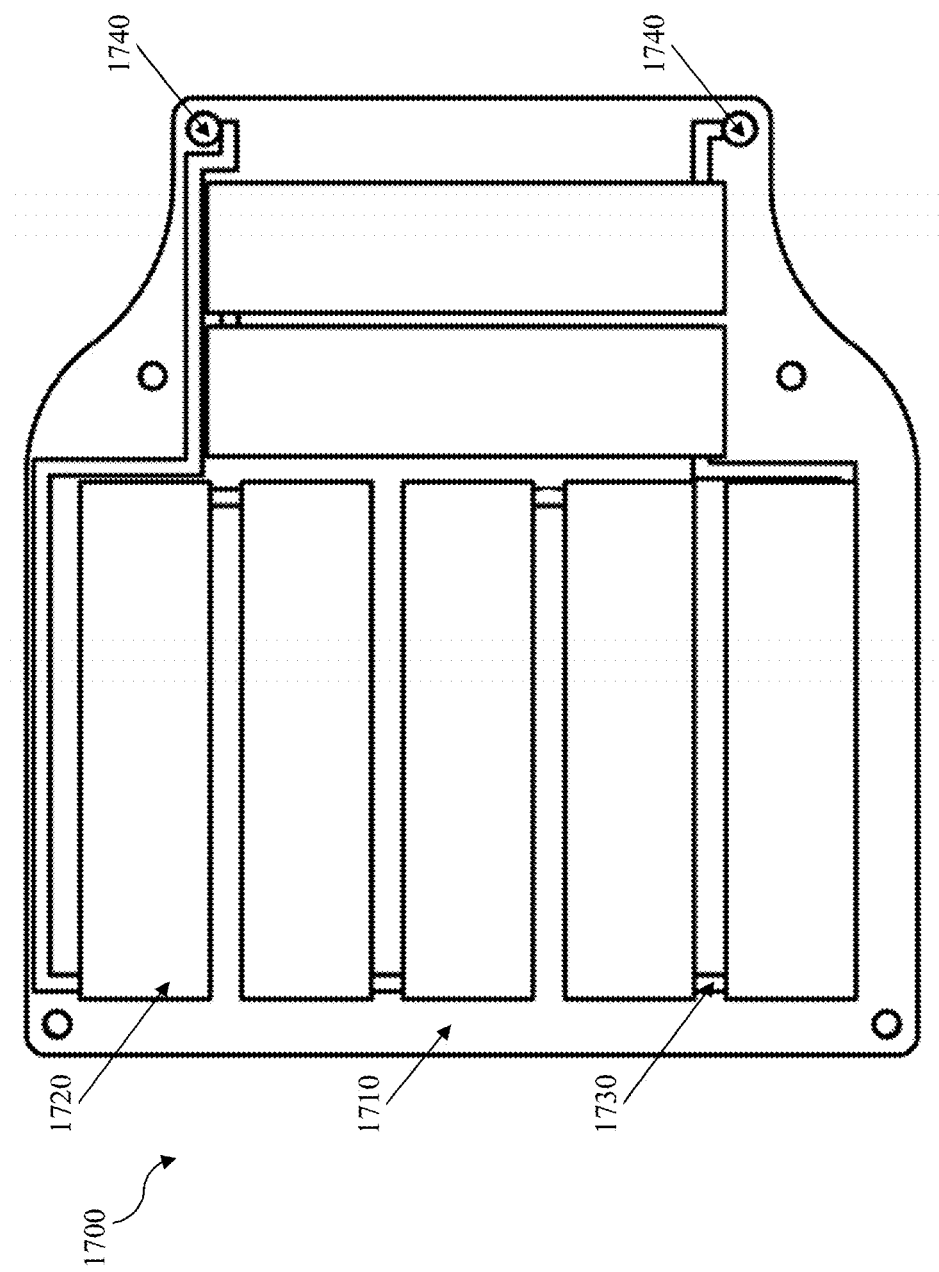
FIG. 17 illustrates an alternative embodiment of a multi-panel solar cell unit suitable for use in various solar cell arrays.

FIG. 17 illustrates an alternative embodiment of a multi-panel solar cell unit 1700 suitable for use in various solar cell arrays. The solar cell unit 1700 has a substrate 1710, which may reflect light, transmit light and/or partially transmit and reflect light. The substrate may also be treated to change light traveling through it, for example, to a different frequency.

Various solar cells 1710 (which may be half-cells) are disposed on the substrate 1710 and are electrically connected by conductor ribbons 1730. At the base of the unit 1700, the conductors 1730 include connection points 1740 which may be configured to be attached to another element, for example, using screws, friction fit connectors, etc.

As shown in this non-limiting embodiment, the solar cells 1710 are connected in series. In an alternative embodiment, the solar cells 1710 may be connected in parallel. Additional electrical components may also be incorporated into the solar cell unit 1700, for example, fuses, meters, etc.

Figure 18:
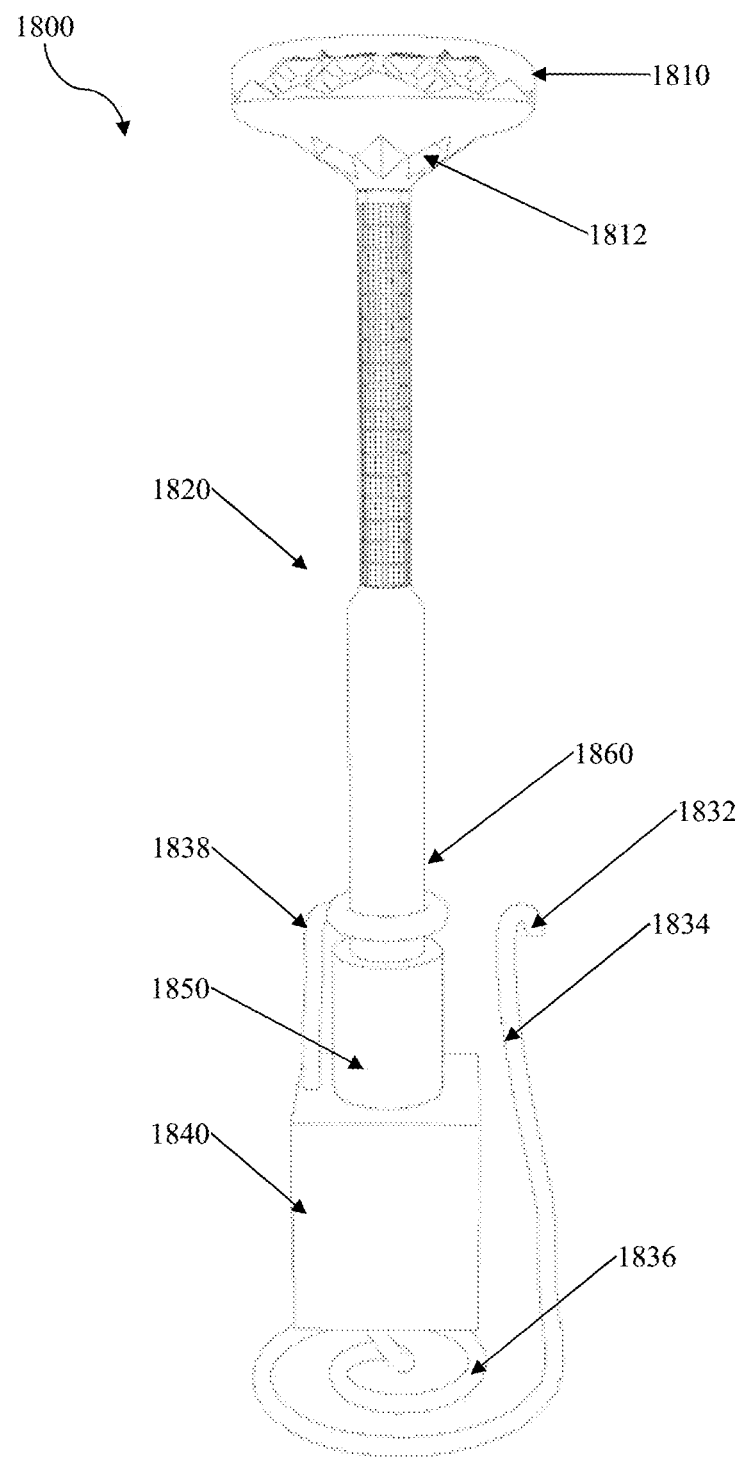
FIG. 18 shows another embodiment of a solar collecting lamppost.
Figure 19:
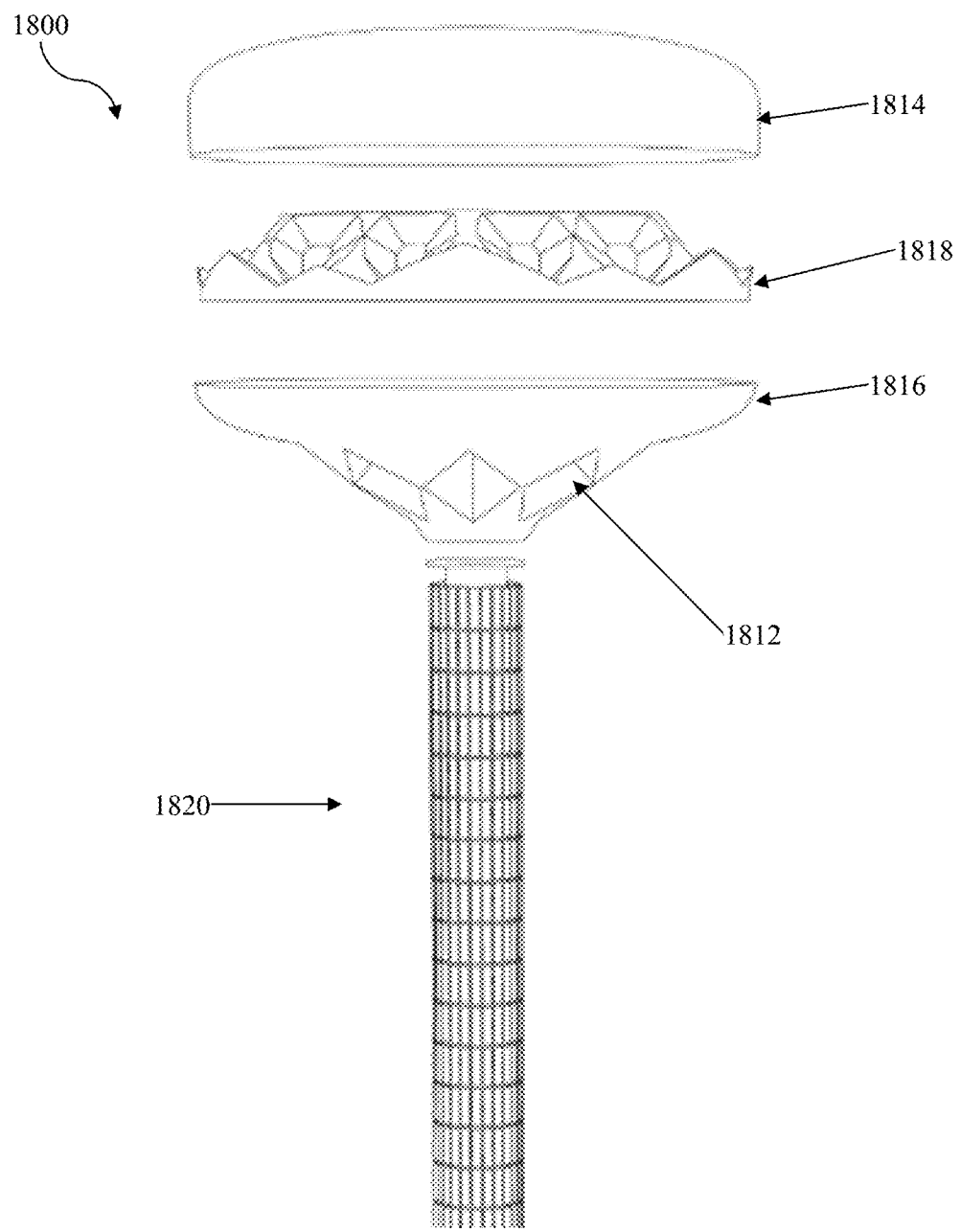
FIG. 19 shows the top of the solar collecting lamppost of FIG. 18.
Figure 20:
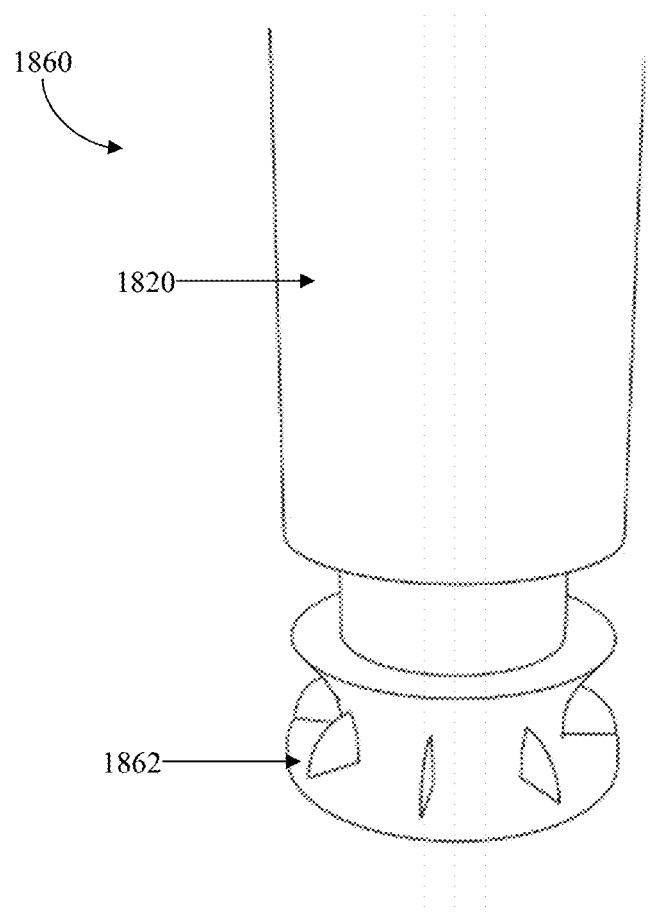
FIG. 20 shows a portion of the base of the solar collecting lamppost of FIG. 18.

FIGS. 18-20 show another embodiment of a solar collecting lamppost 1800. The lamppost 1800 includes a post 1820 which supports a lamp top 1810. The lamp top 19810 includes various lights 1812 which can be used to illuminate the area around the lamppost 1800.

The lamp top 1810 and post 1820 include various solar cell units which can be used to collect solar energy. The lamp top 1810 includes a dome 1814 and top base 1816 which enclose a solar cell array support 1818. Not shown here, solar cell array support 1818 may include various solar panel arrays such as shown in FIG. 8.

Post 1820 extends underground from lamp bottom 1860 which allows additional components to be safely secured in addition to provided support for the lamppost 1800 such as underground post base 1850 which can provide additional counterweight to the lamppost 1800.

In this embodiment, the lamppost 1800 includes an air-cooled system to provide air to the various parts of the lamppost 1800. Air at ground level is collected at vent opening 1832 and carried underground through vent intake tube 1834 which includes vent coil 1836. The coil 1836 allows the air to be further cooled by the ground before entering the underground air chamber 1840.

Vent exhaust tube 1838 then allows the cooler air to be moved to the lamp bottom 1860. From the vent exhaust tube 1838, air can then be moved up through a cavity in the lamp post 1820 and into the lamp top 1810 to help cool the various electrical components. The lamp bottom 1860 may also include fins 1862 which can assist in removing heat from the lamppost 1800.

Figure 21:
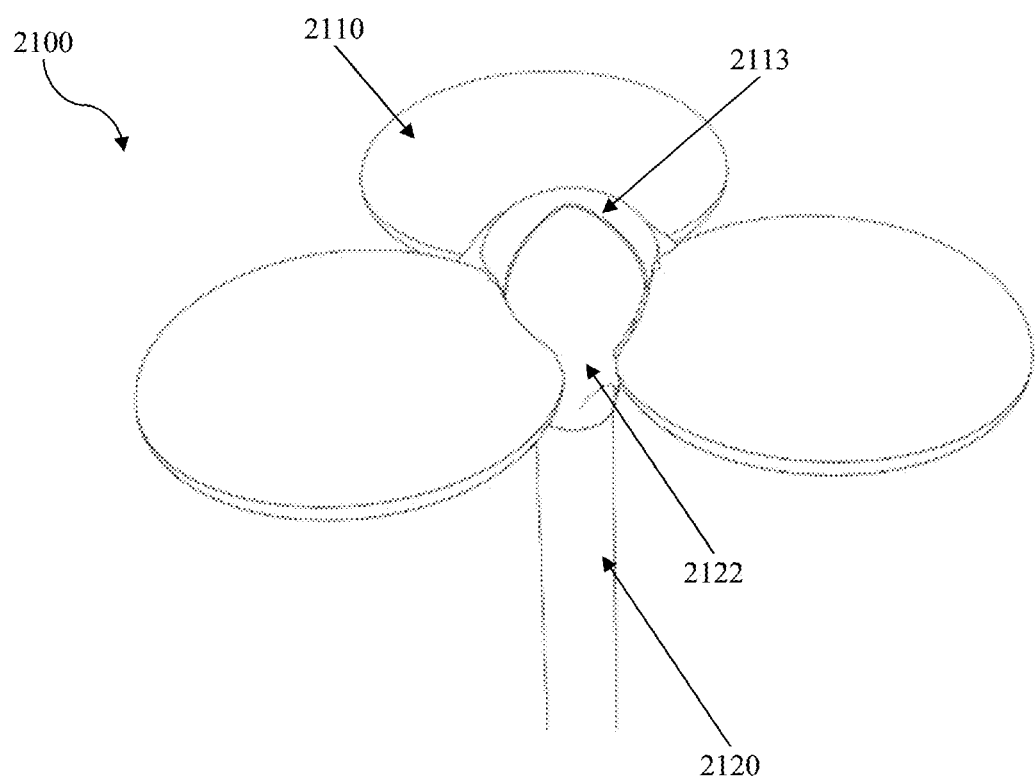
FIG. 21 illustrates a further embodiment of a solar collecting lamppost.

FIG. 21 illustrates a further embodiment of a solar collecting lamppost 2100. In this embodiment, the lamppost 2100 includes three solar cell petals 2110, each of which may include various solar panel arrays. These petals 2110 are connected to the lamp top center 2113 which is connected to the post 2120 at post top 2122. The petals 2110 may be rotated around the post 2120 and/or tilted around the post top 2122. This can ensure the petals 2110 are angled to more directly receive light and/or to reduce weather effect. For example, the petals 2110 may be tilted to avoid damage from hail or other adverse conditions. In some embodiments, petals 2110 may also be shaped to reduce forces caused by the wind and tilted to withstand such conditions. Additionally, the petals 2110 may be tilted to remove unwanted debris or dust.

Figure 22:
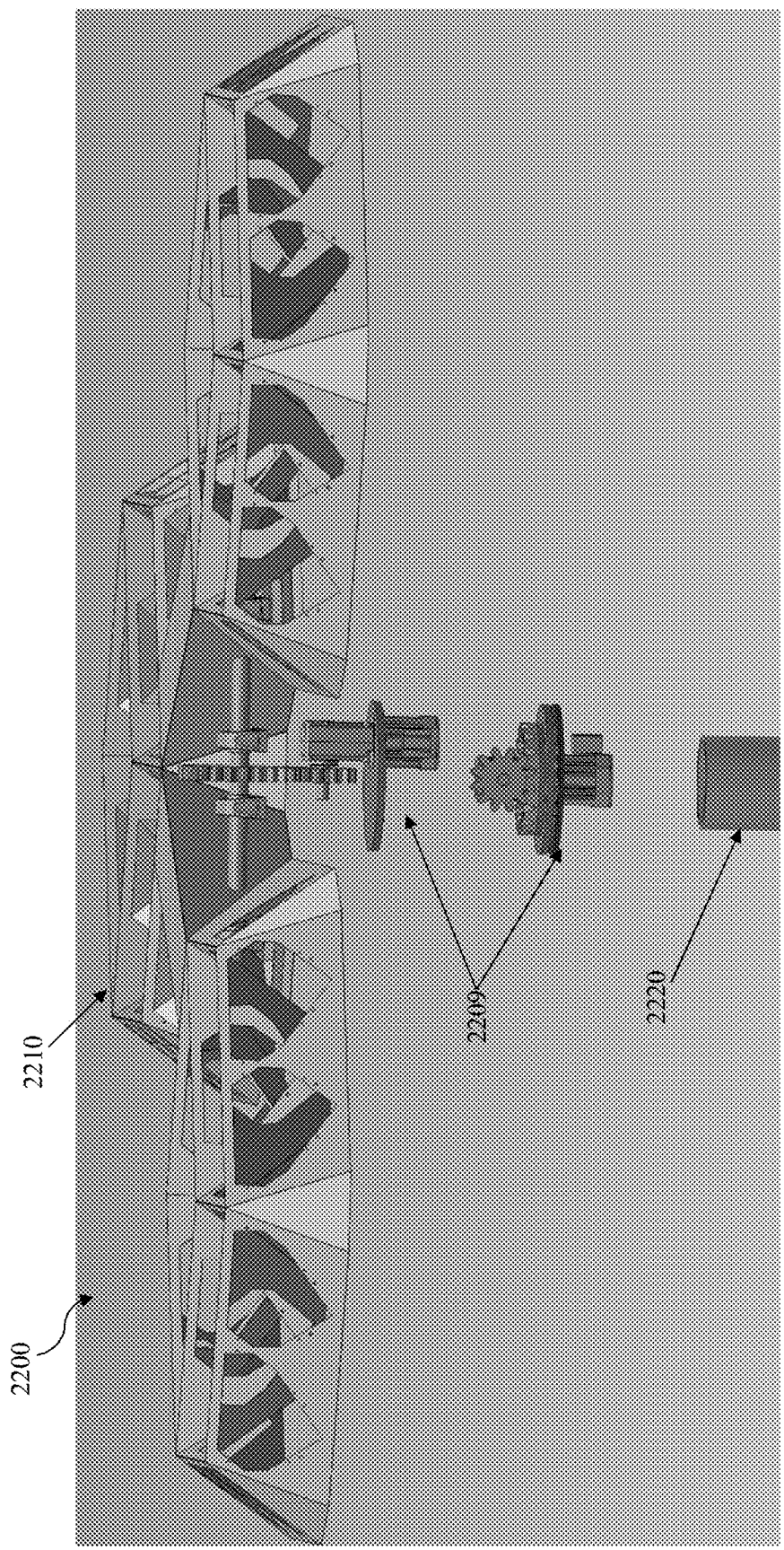
FIG. 22 demonstrates various components of solar collecting lamppost in accordance with an embodiment.
Figure 23:
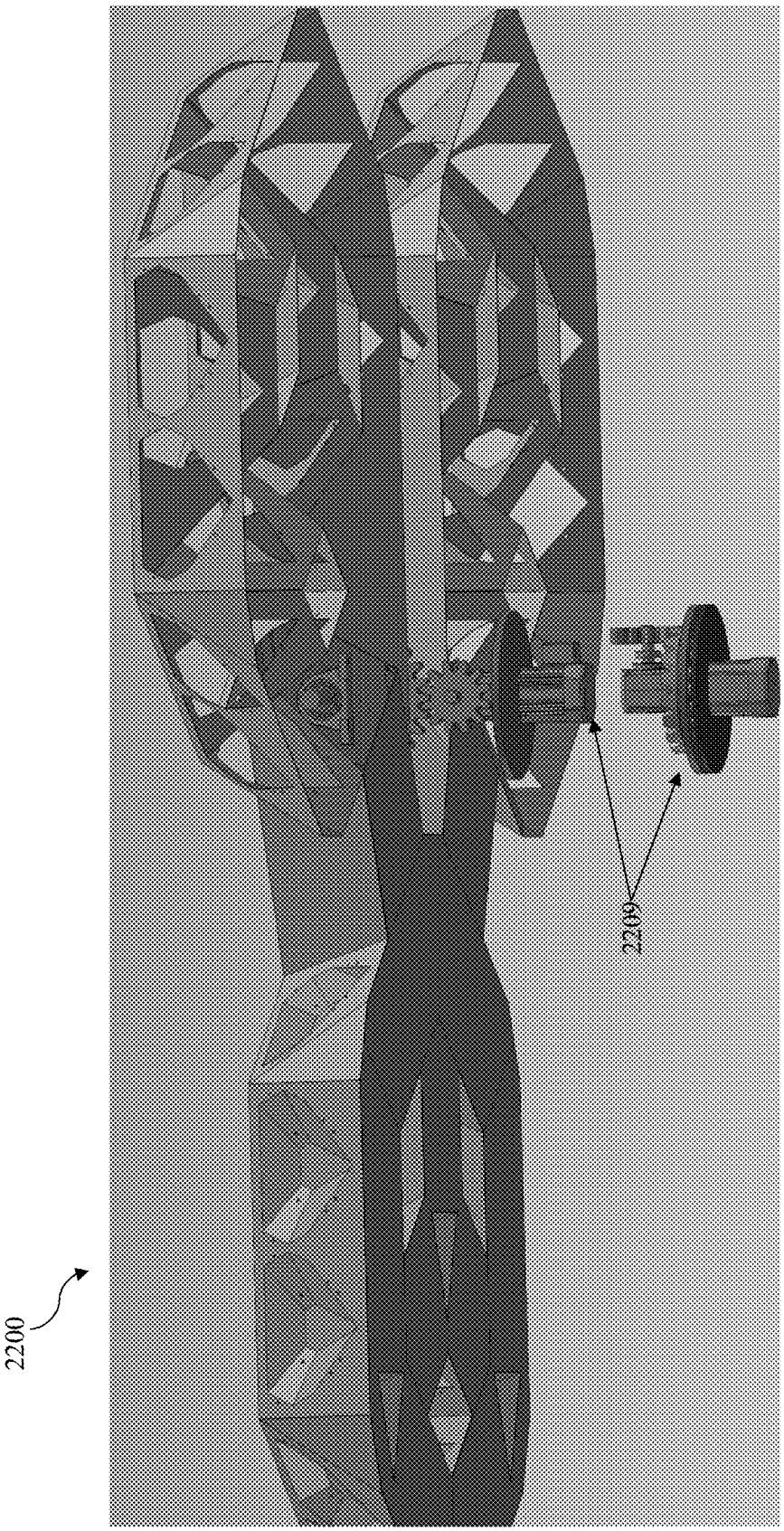
FIG. 23 demonstrates another view of the components of the solar collecting lamppost of FIG. 23.

FIGS. 22-23 demonstrate various components of solar collecting lamppost 2200 in accordance with an embodiment. The lamp top 2210 is connected to the post 2220 with various motors 2209. Activating the motors can change the tilt and/or the rotation of the lamp top 2210. In some embodiments, the motors 2209 may operate using energy collected by the lamppost 2200.

Figure 24:
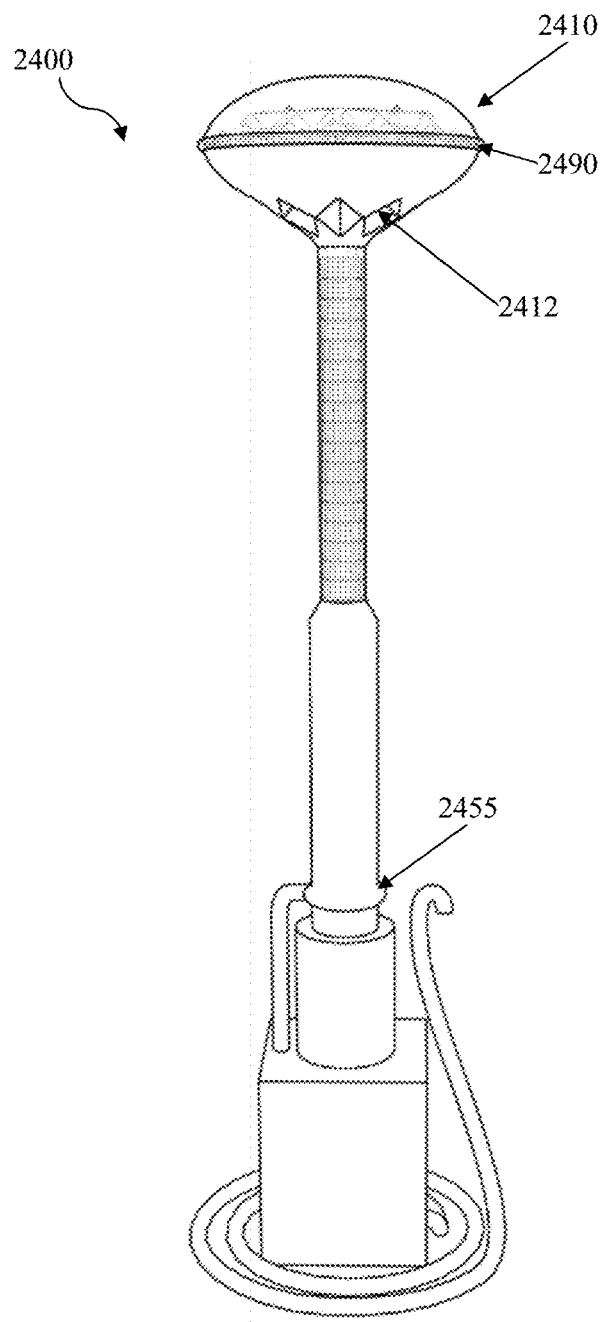
FIG. 24 illustrates another embodiment of a solar collecting lamppost.
Figure 25:
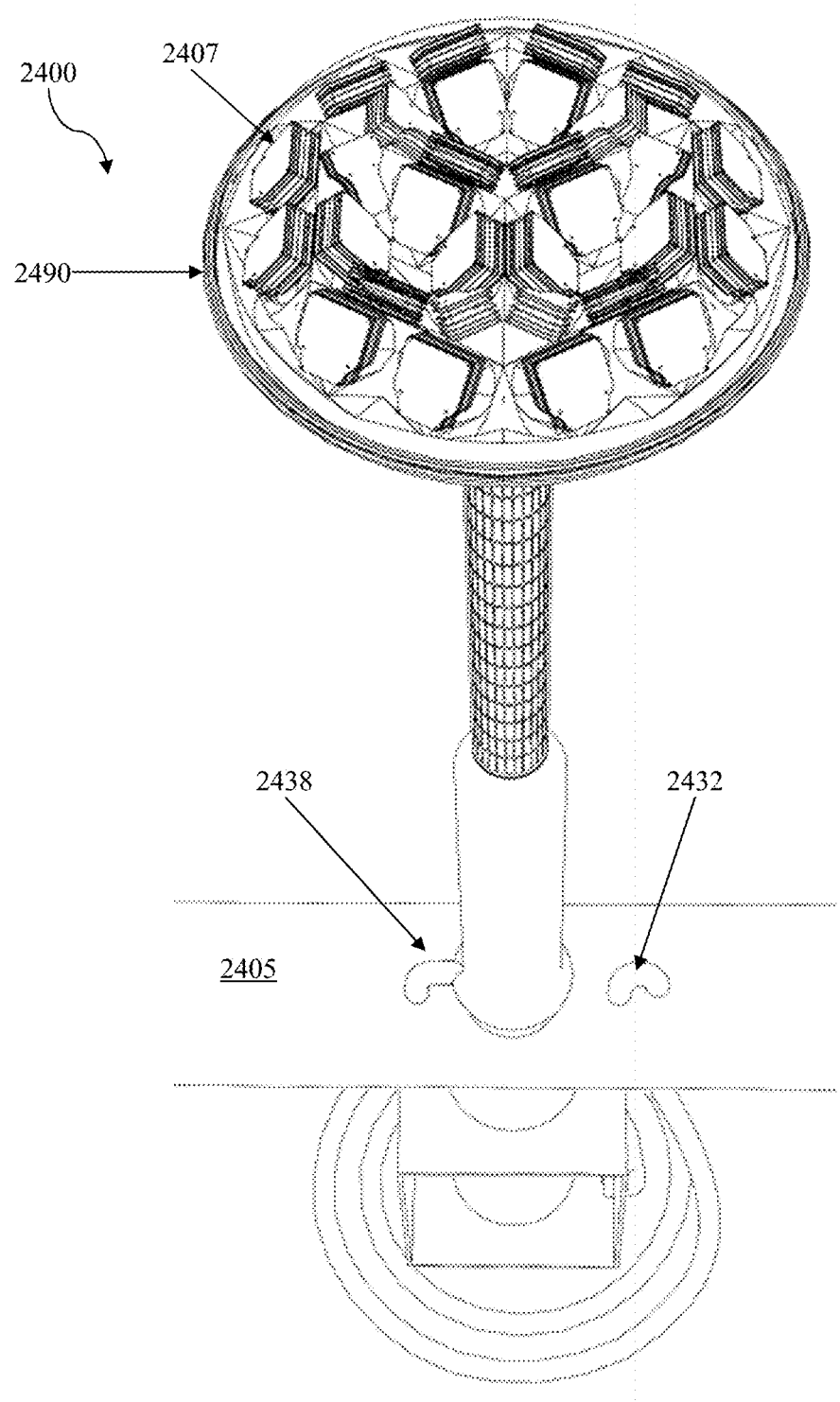
FIG. 25 shows another view of the solar collecting lamppost of FIG. 24.
Figure 26:
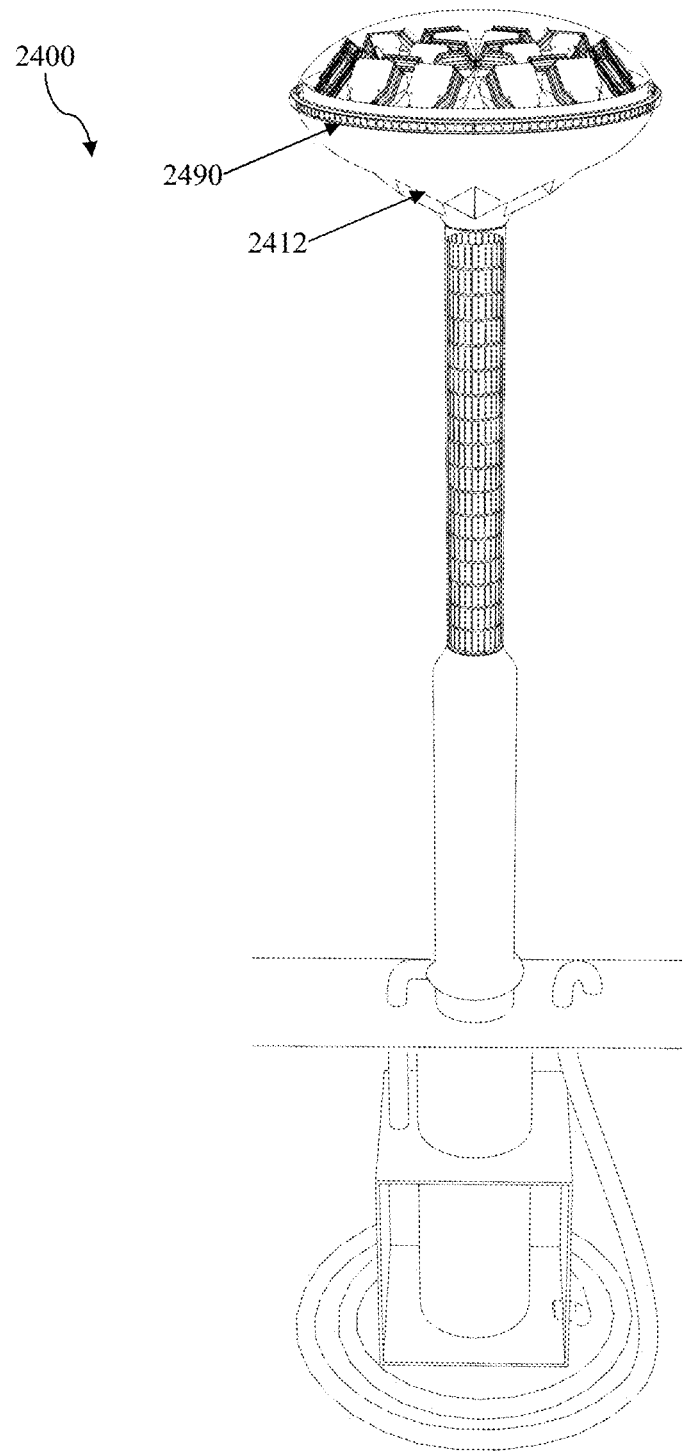
FIG. 26 shows an additional view of the solar collecting lamppost of FIG. 24.
Figure 27:
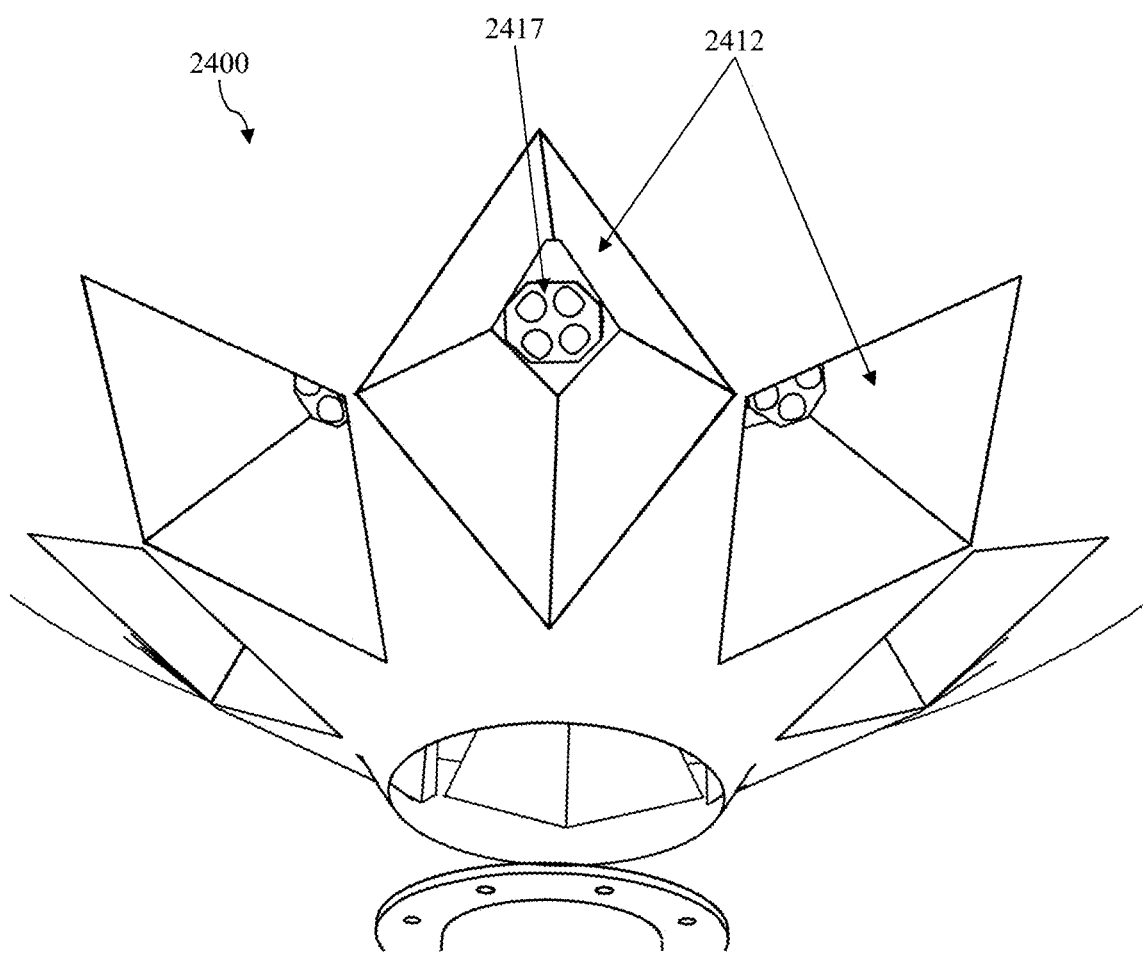
FIG. 27 shows a view of the top of the solar collecting lamppost of FIG. 24.

FIG. 24 illustrates another embodiment of a solar collecting lamppost 2400. Lamp top 2410 includes an LED ring 2490 which circles the lamp top 2410. The LED ring may be used to provide additional lighting or functionality.

In some embodiments, the LED 2417 of lights 1812 and/or LED ring 2490 may be programmed to produce various colors. These colors may be used for traffic control (e.g., a portion of the LED ring 2490 may light up to a green color to indicate traffic may proceed and a different portion may light up red to indicate traffic in that direction should stop). Lights 1812 and/or LED ring 2490 may also be used to indicate directions, for example, several lampposts 2400 may light up blue and/or lights 1812 may project blue light at the ground to show a path. In further embodiments, the LED ring 2490 may be used to indicate an emergency, for example, by flashing red light.

As shown in this embodiment, the lamp bottom is protected with a cover 2455. This can help prevent unwanted material (or pests) from entering the lamppost 2400.

FIGS. 25-28 show additional views of the solar collecting lamppost of FIG. 24. The top of lamppost 2400 includes Stacked array of solar cell 2407. This view also demonstrates the air vent intake 2432 and air vent supply 2438 above the ground 2405. The air vent intake 2432 may include various covers/lids to prevent access to the lamppost 2400. The air vent intake 2432 may also be closed to prevent flooding.

Figure 28:
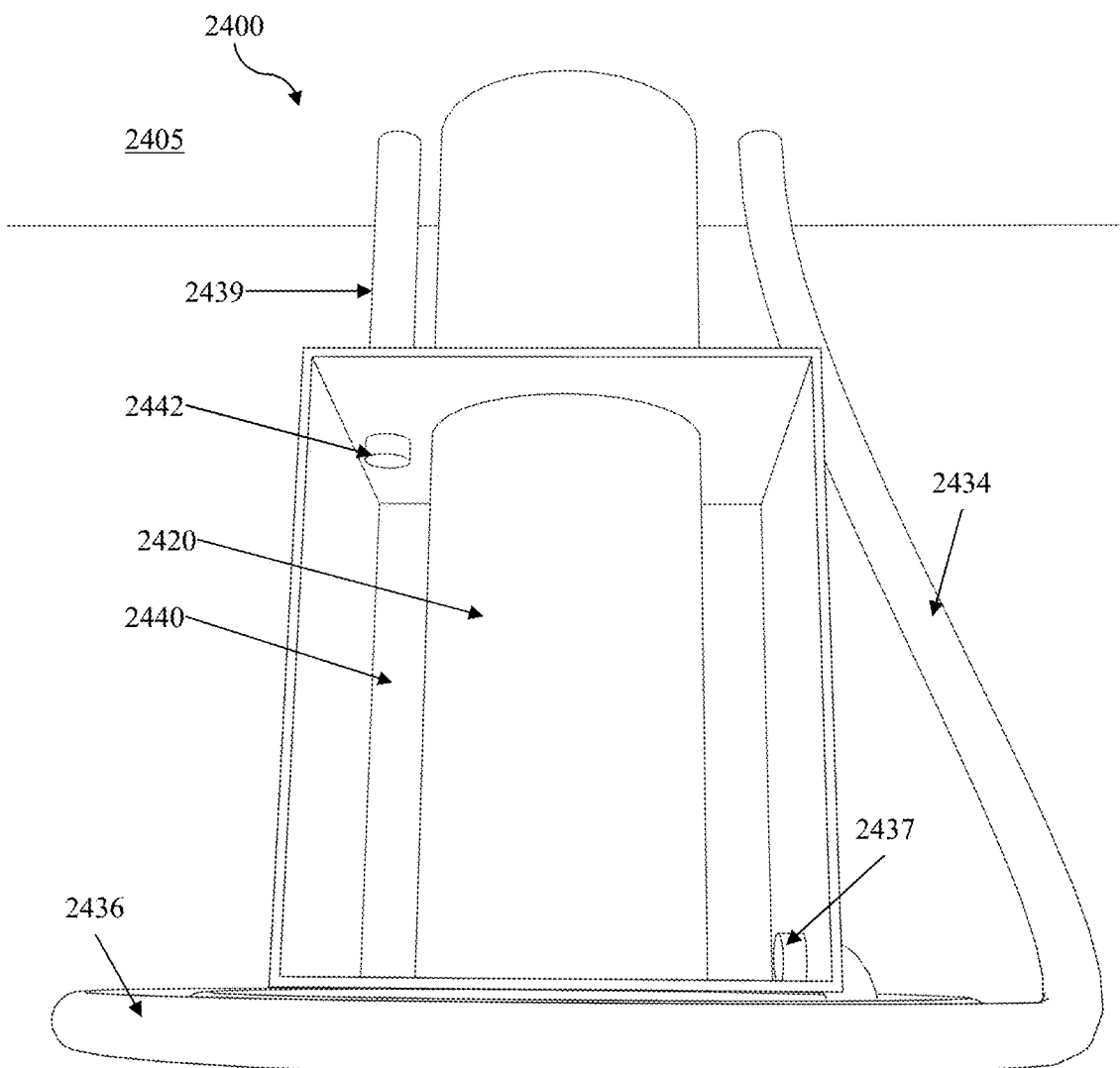
FIG. 28 shows a view of the underground portion of the solar collecting lamppost of FIG. 24.

FIG. 28 shows a view of the underground portion of the solar collecting lamppost 2400 of FIG. 24. Post 2420 extends into the underground cavity 2440. The air vent intake tubing 2434 brings air from the air vent intake 2432 and creates air tubing coil 2436 beneath the underground cavity 2440. In some embodiments, the post 2420 may extend below the underground cavity 2440 and through the center of the coil 2436. Air intake opening 2437 allows air access to the underground cavity 2440. Air can then travel through air supply opening 2442 into air vent supply tubing 2439 to air vent supply 2438.

Figure 29:
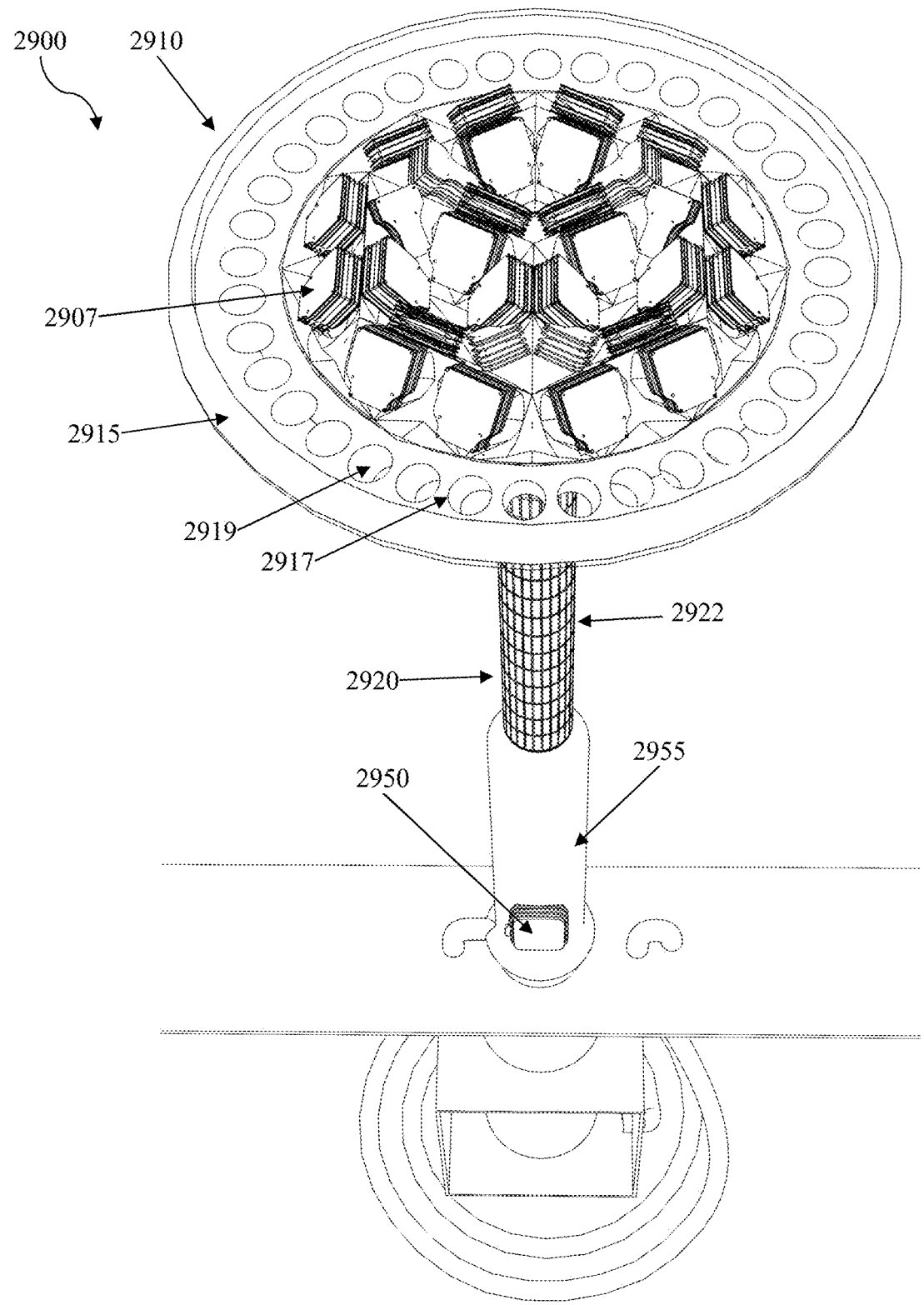
FIG. 29 illustrates a further embodiment of a solar collecting lamppost.
Figure 30:
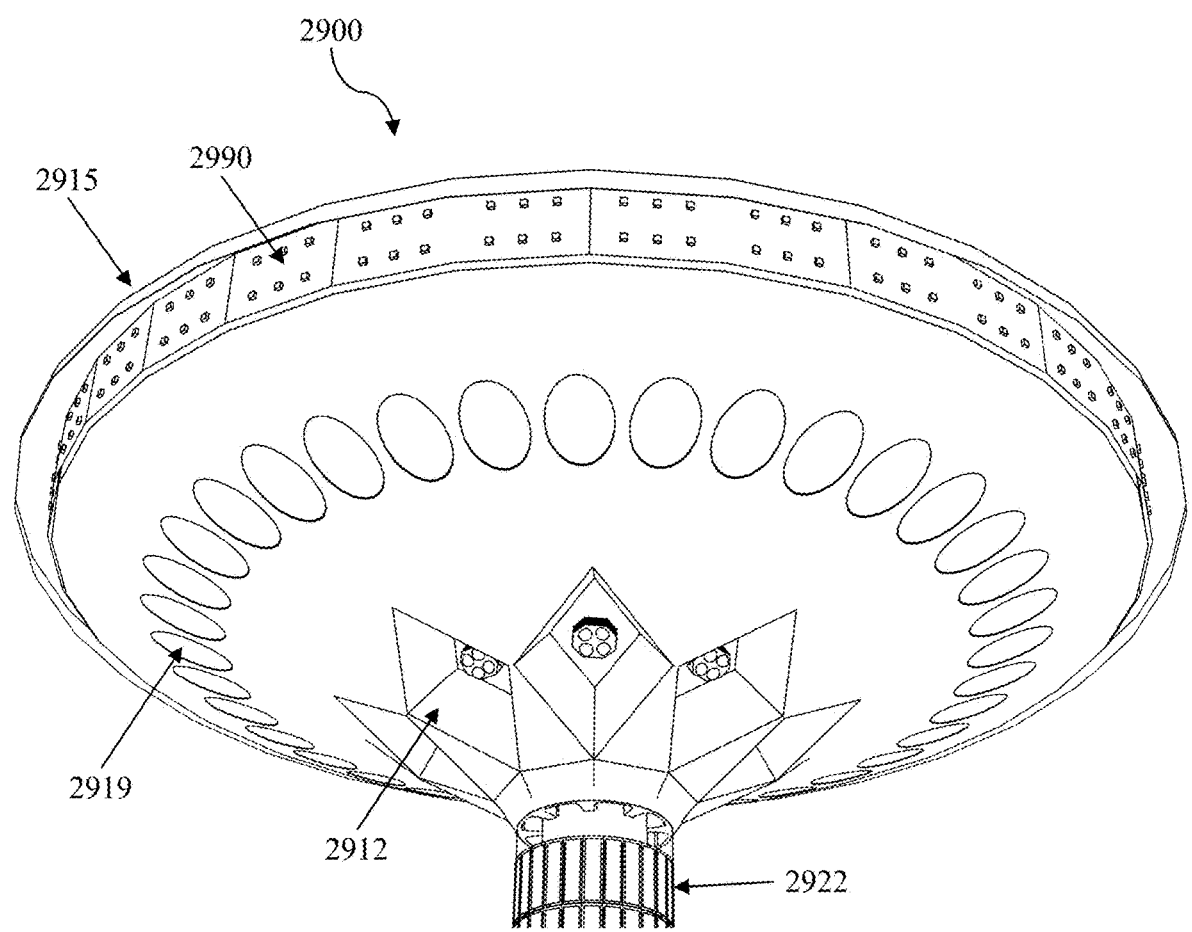
FIG. 30 shows another view of the solar collecting lamppost of FIG. 29.

FIGS. 29-30 illustrate a further embodiment of a solar collecting lamppost 2900. The lamppost top 2910 includes staked array of solar cells 2907 held by lamp top frame 2917. The lamp top frame 2917 also includes a lamp top fringe 2915 around its outer circumference and reflective opening 2919. The reflective opening 2919 may be angled so that light from above (e.g., the sun) is directed at the post 2920 in order to better illuminate the solar cells 2922 there. The reflective opening 2919 may have the same angle or may include different angles so as to better spread the light, for example, one reflective opening 2919 may direct the light toward the upper portion of the post 2920 and another reflective opening 2919 may direct the light lower on the post (closer to cover 2955).

The post 2920 may include an interface for charging devices. In this non-limiting embodiment, the cover 2955 includes a car charger 2950 so that the lamppost 2900 may be placed in a parking lot and used to charge an electric car.

In other embodiments, the post 2920 may include cellphone chargers, electrical outlets, etc. The lamppost 2900 may also be connected to an electrical grid to send additional energy collected and/or to assist in charging devices.

As shown in FIG. 30, the lamppost 2900 also includes an LED ring 2990 beneath lamp top fringe 2915. In some embodiments, the fringe 2915 may be reflective so as to angle light from the LED ring 2990 downward. Lights 2912 may also include reflective sides so as to angle the light for better illumination.

Reflective opening 2919 may include covers or lenses to focus the light and/or to treat the light being transmitted through them, for example, so that the light is adjusted to a frequency for better absorption by the solar cells 2922 in post 2920.

Figure 31:
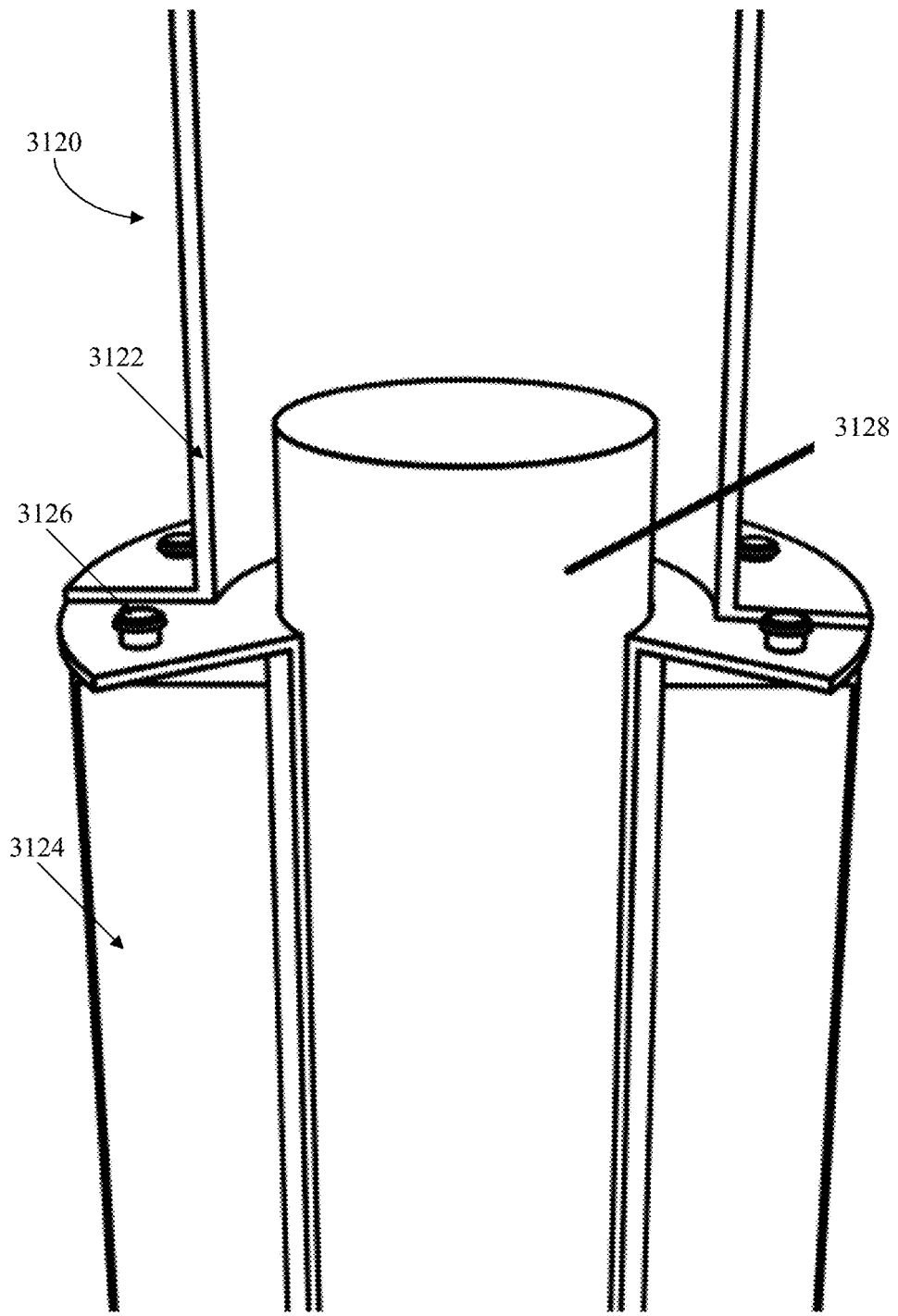
FIG. 31 demonstrates a cut-away view of a post suitable for use in various embodiments.

FIG. 31 demonstrates a cut-away view of a post 3120 suitable for use in various embodiments. The post 3120 includes an inner pole 3122 which is connected to a bottom pole 3124, such as with bolts 3126. Between the inner pole 3122 and bottom pole 3124 is a battery 3128. The battery 3128 may be configured to store energy collected from the various solar cells. In some embodiments, the battery 3128 may include one or more individual batteries and/or capacitors.

Figure 32:
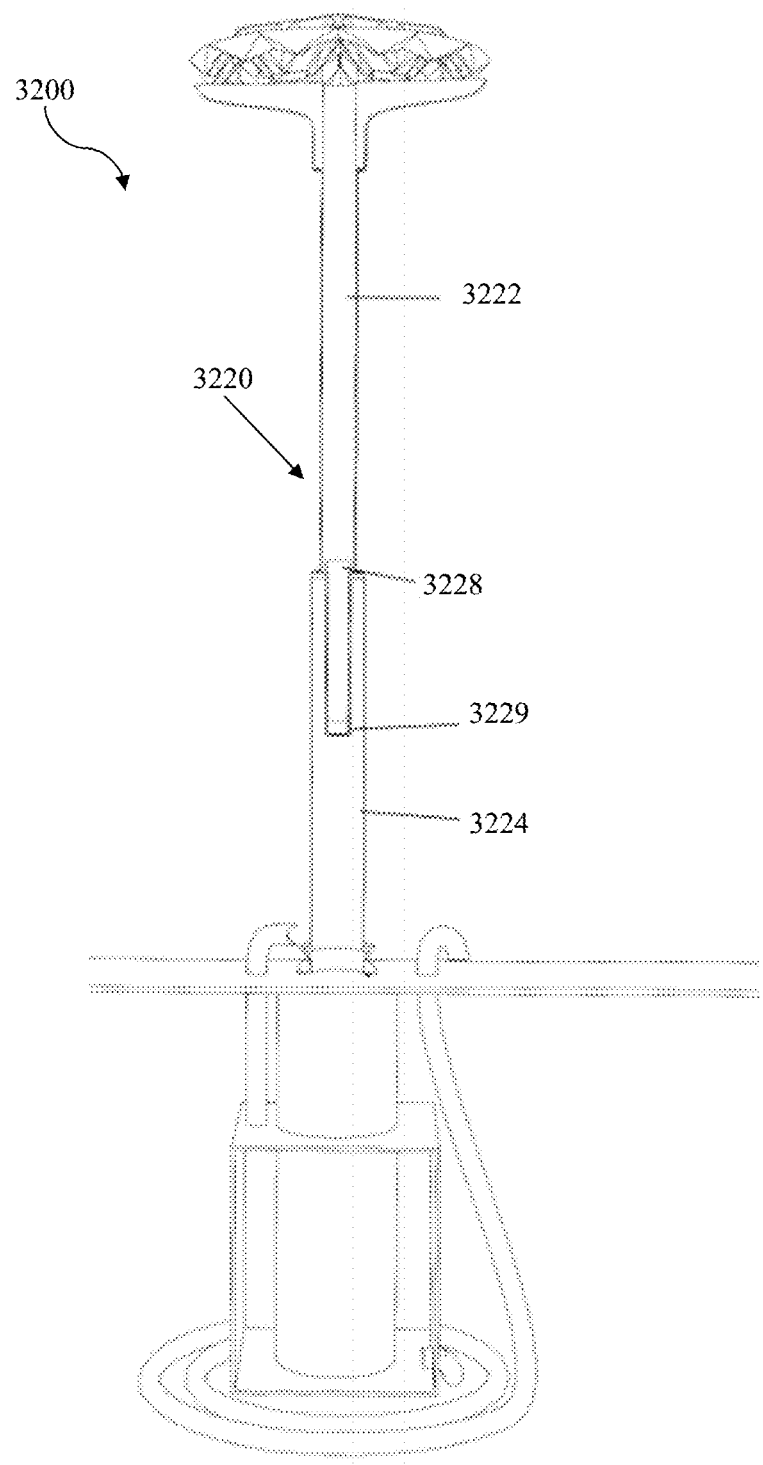
FIG. 32 illustrates another embodiment of a solar collecting lamppost.

FIG. 32 illustrates another embodiment of a solar collecting lamppost 3200. The inner pole 3220 and bottom pole 3224 support the lamp and hold the battery Housing 3229 and battery 3228.

Figure 33:
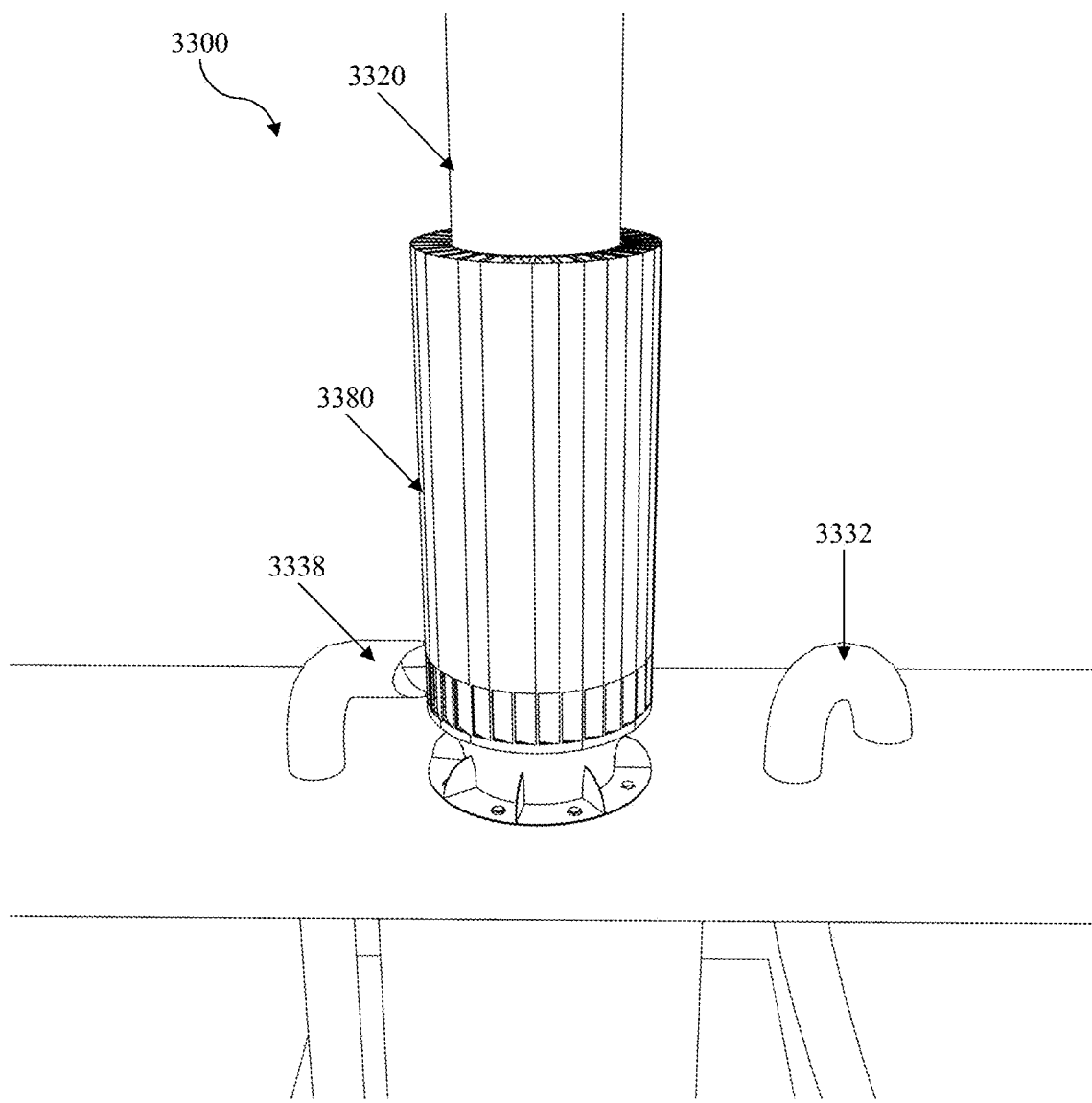
FIG. 33 demonstrates a view of a portion of a post suitable for use in various embodiments.

In some embodiments, the air supply may be used to generate electricity as well using a gyromagnetic generator. FIG. 33 demonstrates a view of a portion of a post 3320 suitable for use in various embodiments. The lamppost 3300 includes a gyromagnetic generator 3380 located around the post 3320. When air (originally form air vent intake 3332) is supplied by air vent supply 3338, the gyromagnetic generator 3380 is spun around the post 3320, for example, using magnets powered by the lamppost 3300. This can be used to help force the air into the post 3320 and up towards the top of the lamppost 3200 in order to provide cooling to the various components. The gyromagnetic generator 3380 may be covered so as to avoid interference and/or damage, such as by cover 2955.

In some embodiments, a dynamo may replace the gyromagnetic generator to create electricity when the dynamo is spun. This energy can be collected and transmitted to a battery or capacitor for storage.

Figure 34:
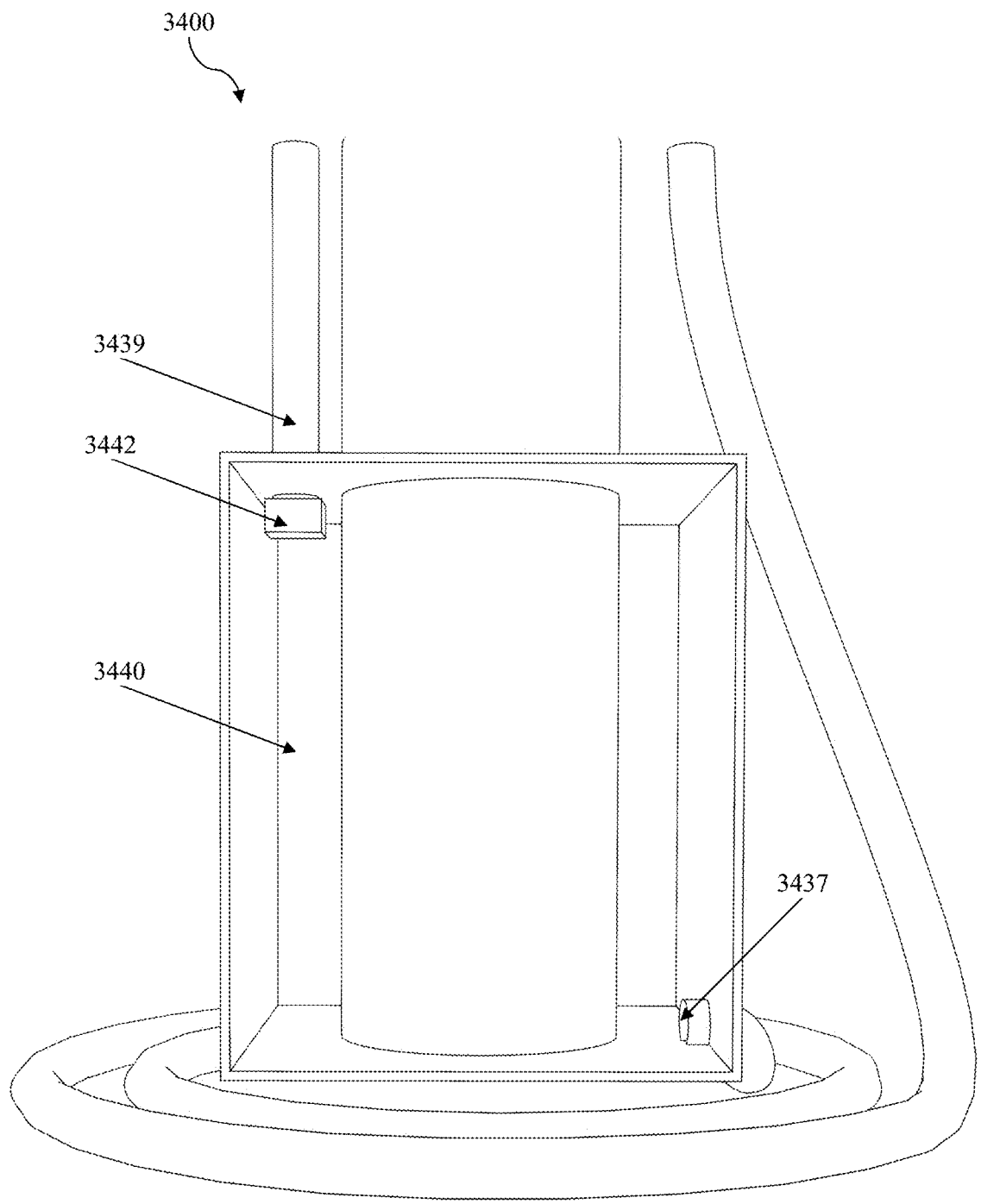
FIG. 34 shows a view of another underground portion of a solar collecting lamppost.

The underground portion may also include components to treat the air in order to avoid damage to the lamp. FIG. 34 shows a view of another underground portion of a solar collecting lamppost 3400. In this embodiment, a dehumidifier box 3442 covers the entrance of the air vent supply tubing 3439 and can be used to reduce the amount of moisture in the air before introducing the air to the interior of the lamppost 3400.

Filter and/or other dehumidifiers may be provided, for example, within underground cavity 3440 and/or at air intake opening 3437. Additionally, a fan may be provided to move the air.

The underground cavity 3440 may also include a semi-permeable membrane to allow moisture to escape.

Figure 35:
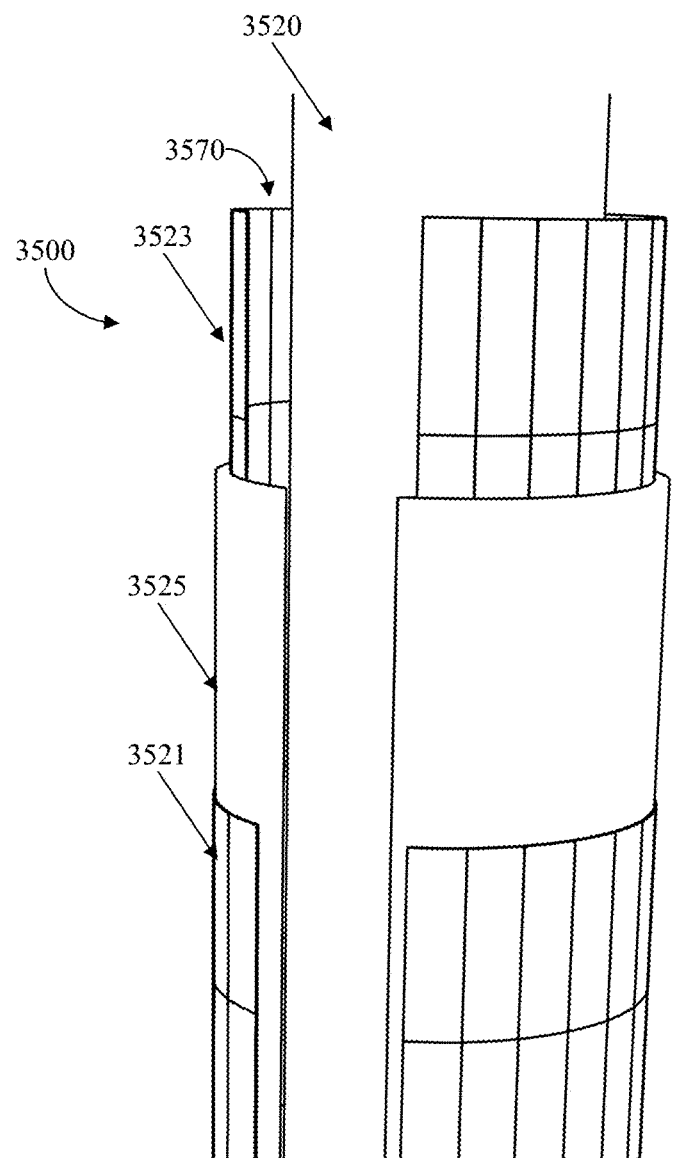
FIG. 35 demonstrates a cut-away view of a post suitable for use in various embodiments.

FIG. 35 demonstrates a cut-away view of a post suitable for use in various embodiments. In this embodiment, the post 3520 of lamppost 3500 is surrounded by a sandwiched-layer of solar cells. This layer includes an outer tube of solar cells 3521 and an inner tube of solar cells 3523 separated by an acrylic tubing 3525. As shown, an air flow gap 3570 is provided between the inner tube of solar cells 3523 and the post 3520. The post 3520 may be reflective so that light can be reflected back at the inner tube of solar cells 3523.

Figure 36A:
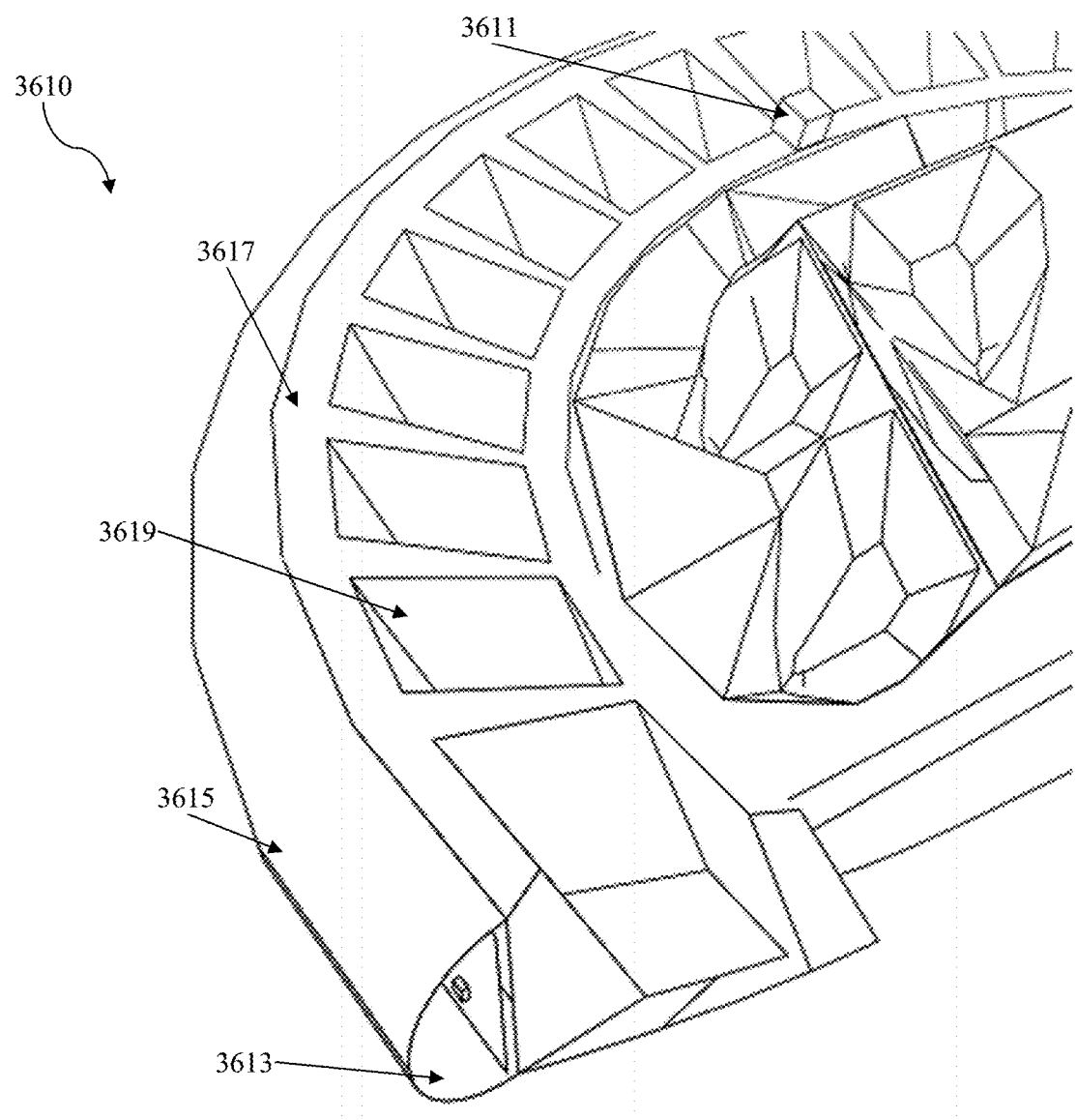
FIG. 36A illustrates a lamp post top suitable for use in various embodiments.

FIG. 36A illustrates a lamppost top 3610 suitable for use in various embodiments. In this embodiment, the lamppost top 3610 includes an audio deterrent 3611 which emits sounds (e.g., ultra-sonic noise) to deter birds and pests.

Additionally, the lamppost top 3610 features square-shaped reflective opening 3619 in the lamp top frame 3617. The sides of the square-shaped reflective opening 3619 may also be angled to form a V-shaped cavity can reflects light in various directions. These reflective opening 3619 can direct light at the post below the lamppost top 3610. As discussed above, these reflective opening 3619 may direct light at different areas of the post so as to better spread the light. In further embodiments, the reflective opening 3619 can direct at least a portion of the light upwards, for example, onto a reflective surface on the interior of a dome covering the lamppost top 3610 which then directs the light at various solar collectors in the lamppost top 3610.

As shown, the lamppost top 3610 includes a lamp top fringe 3615 and a clear fringe cover 3613 beneath the lamp top fringe 3615. This provides a tube ring around the lamppost top 3610 which can include various LEDs. The clear fringe cover 3613 may be configured to help focus or disperse the light from the LEDs.

Figure 36B:
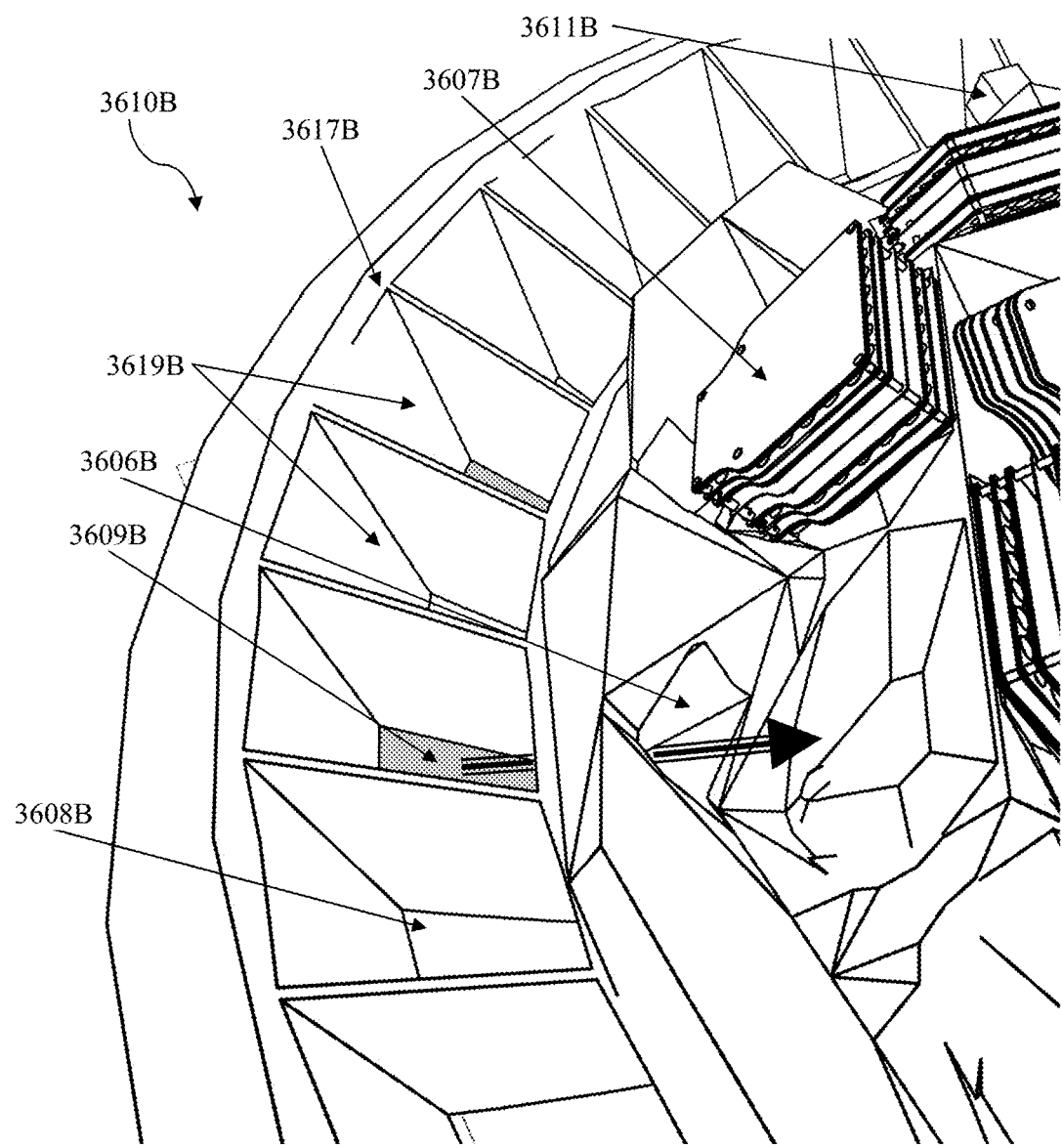
FIG. 36B illustrates another lamp post top suitable for use in various embodiments.
Figure 36C:
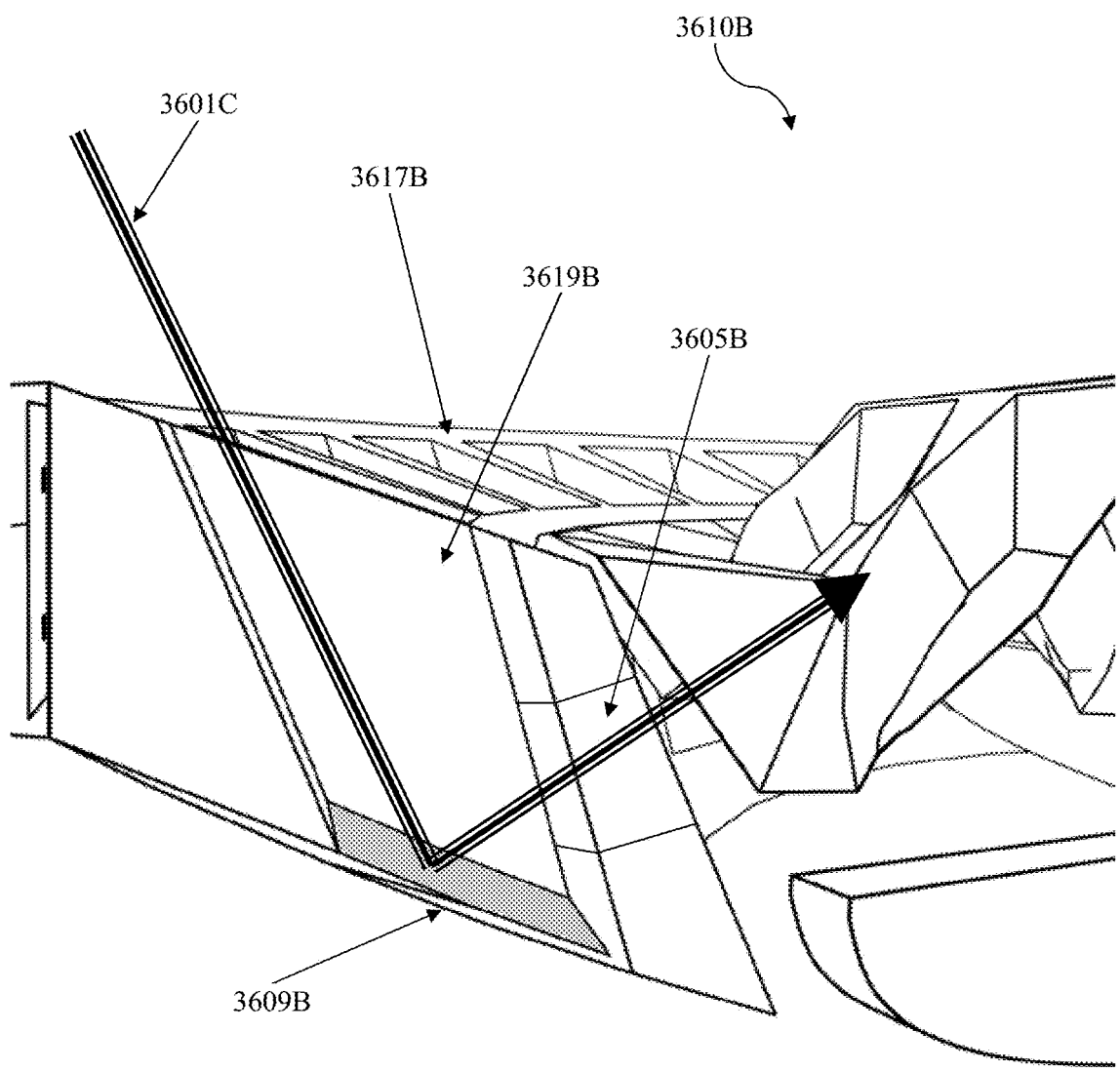
FIG. 36C illustrates a light path in the lamp post top if FIG. 36B.

FIGS. 36B-36C illustrate a lamppost top 3610B suitable for use in various embodiments. In this embodiment, the square-shaped reflective openings 3619B in the lamp top frame 3617B direct light at the stacked array of solar cell 3607B. At the bottom of the square-shaped reflective openings 3619B may be a reflector or bottom 3609B to help redirect light back into the square-shaped reflective openings 3619B and towards the stacked array of solar cell 3607B. A light ray 3601C is reflected by the sides and bottom 3609B of square-shaped reflective openings 3619B in FIG. 36C.

The square-shaped reflective openings 3619B may include an opening or transparent side 3605B which can allow light 3601C to be transmitted through the lamp top frame 3617B and towards the stacked array of solar cell 3607B. The lamp top frame 3617B may have a matching opening 3606B.

Other square-shaped reflective openings 3619B may have an opening or a transparent cover 3608B. The cover may be configured to focus light and/or to modify the light, for example, to change it to a spectrum more ready collected by solar collectors in the post.

Various surfaces in the lamp top frame 3617B may also be reflective. For example, the surfaces beneath and/or adjacent to the stacked array of solar cell 3607B. The lamp top frame 3617B may include chrome surfaces and/or treated surfaces to change the spectrum of the reflected light. Likewise, the lamp top frame 3617B may have surfaces configured to focus and/or direct the light, such as, to bring more light to the stacked arrays of solar cell 3607B.

Additionally, the lamppost top 3610B includes an audio deterrent 3611B which emits sounds (e.g., ultra-sonic noise) to deter birds and pests.

Figure 36D:
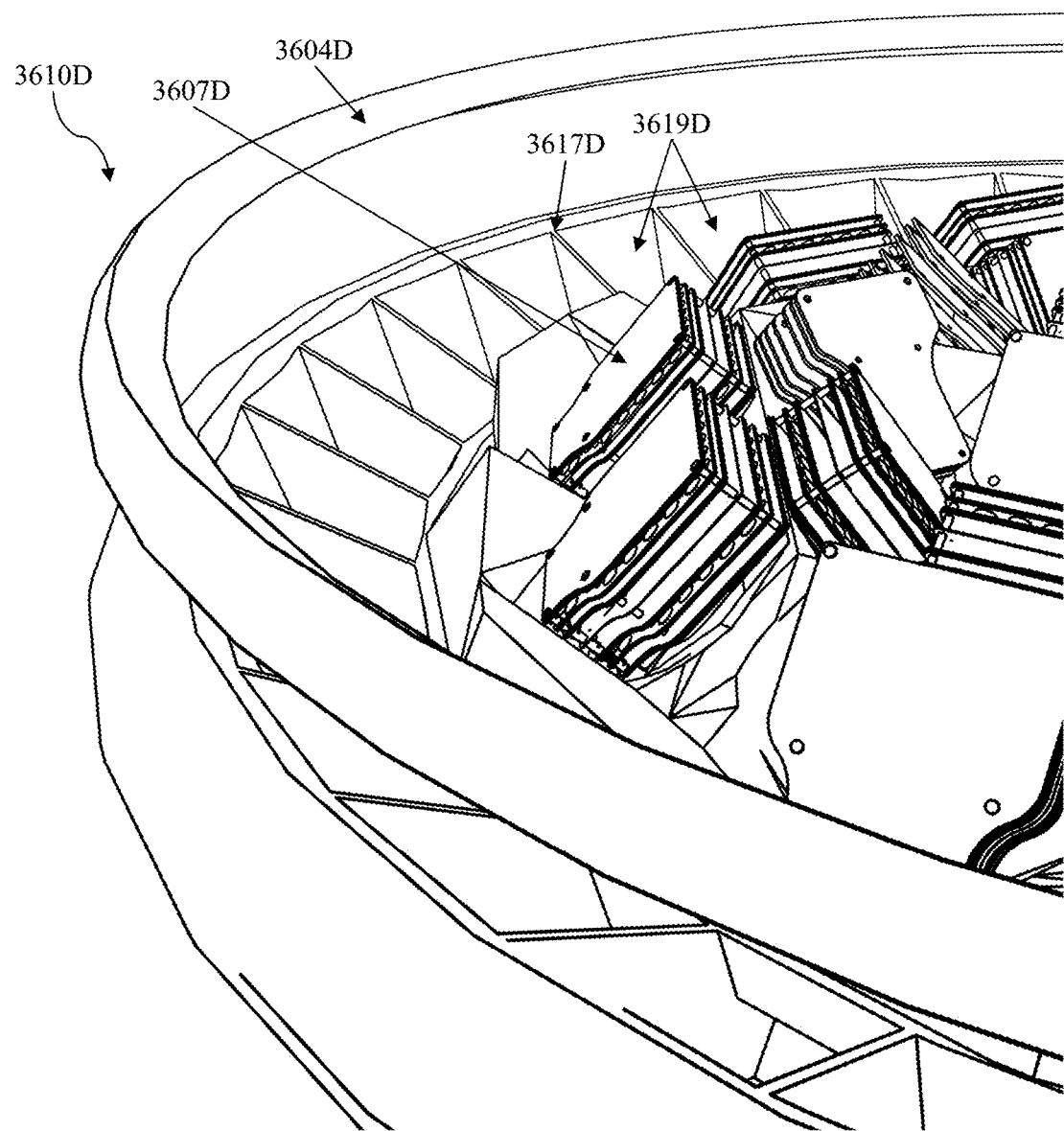
FIG. 36D illustrates a further lamp post top suitable for use in various embodiments.

FIG. 36D illustrates a further lamppost top 3610D suitable for use in various embodiments. In this embodiment, the square-shaped reflective openings 3619D in the lamp top frame 3617D direct light at the stacked array of solar cell 3607D. In addition, a reflective flange 3604D provides additional surfaces with which to direct the light on the solar cell 3607D. This flange 3604D has a ramped inner surface which may also be treated with a coating help collection of the light.

Figure 37A:
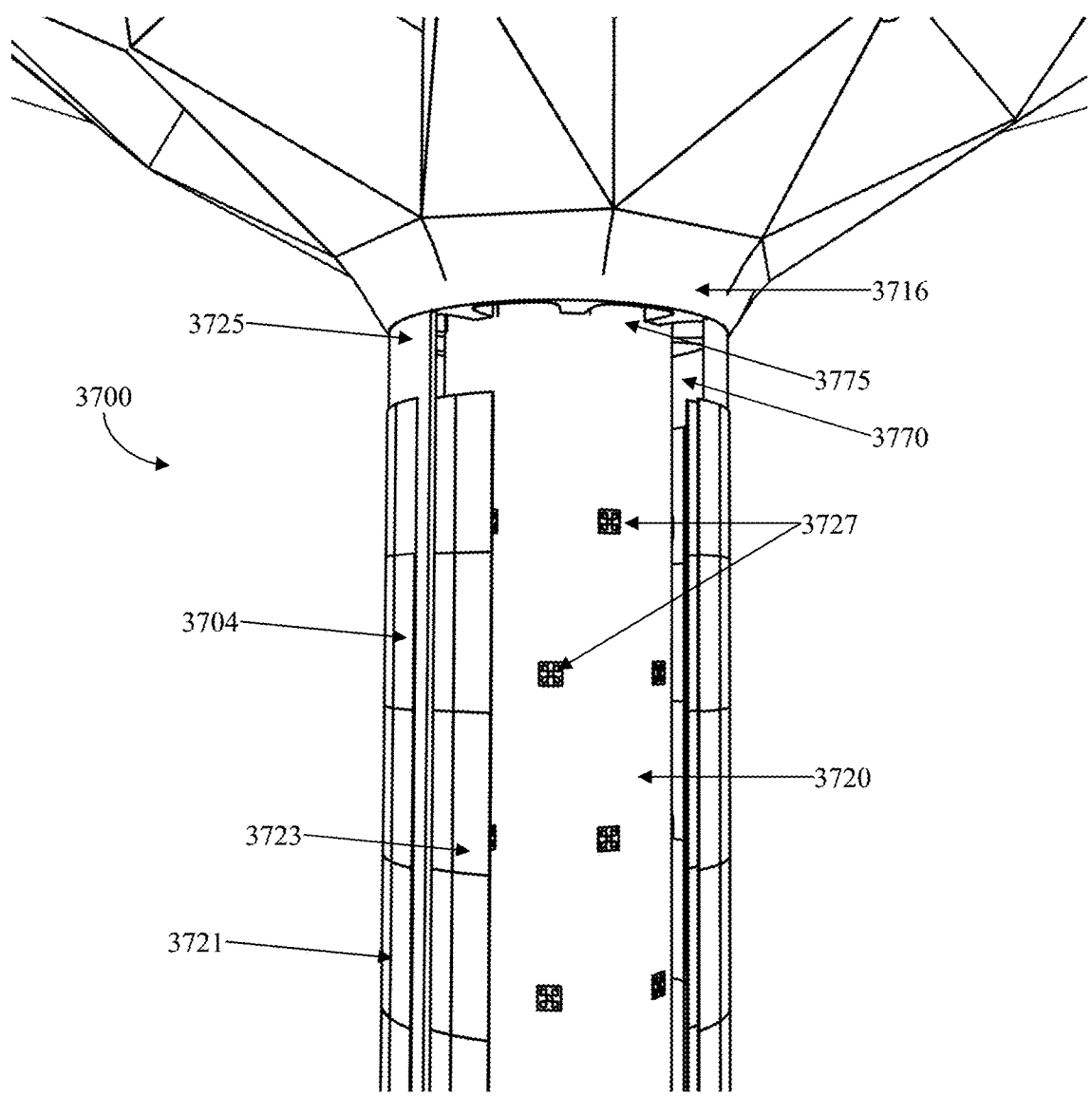
FIG. 37A illustrates a lamp post and top suitable for use in various embodiments.

FIG. 37A illustrates a lamppost 3700 suitable for use in various embodiments. The lamppost 3700 has a sandwiched-layer of solar cells around the post 3720. This layer features an outer tube of solar cells 3721 and an inner tube of solar cells 3723 with an acrylic tube 3725 between. The post 3720 has various LEDs 3727 which can illuminate the solar cells 3721, 3723 and may also be covered in a reflective coating. The acrylic tube 3725 may include a treatment or coating to alter light passing through so as to improve collection.

The sandwiched layers 3721, 3723, 3725 provide an air flow gap 3770 around the post 3720. Cooler air may be introduced below at the base of post and drawn up through the lamppost 3700 into the lamp top base 3716 through the air flow gap 3770 and air flow openings 3775. This can assist in keeping the electronics and other components at operational temperatures.

Figure 37B:
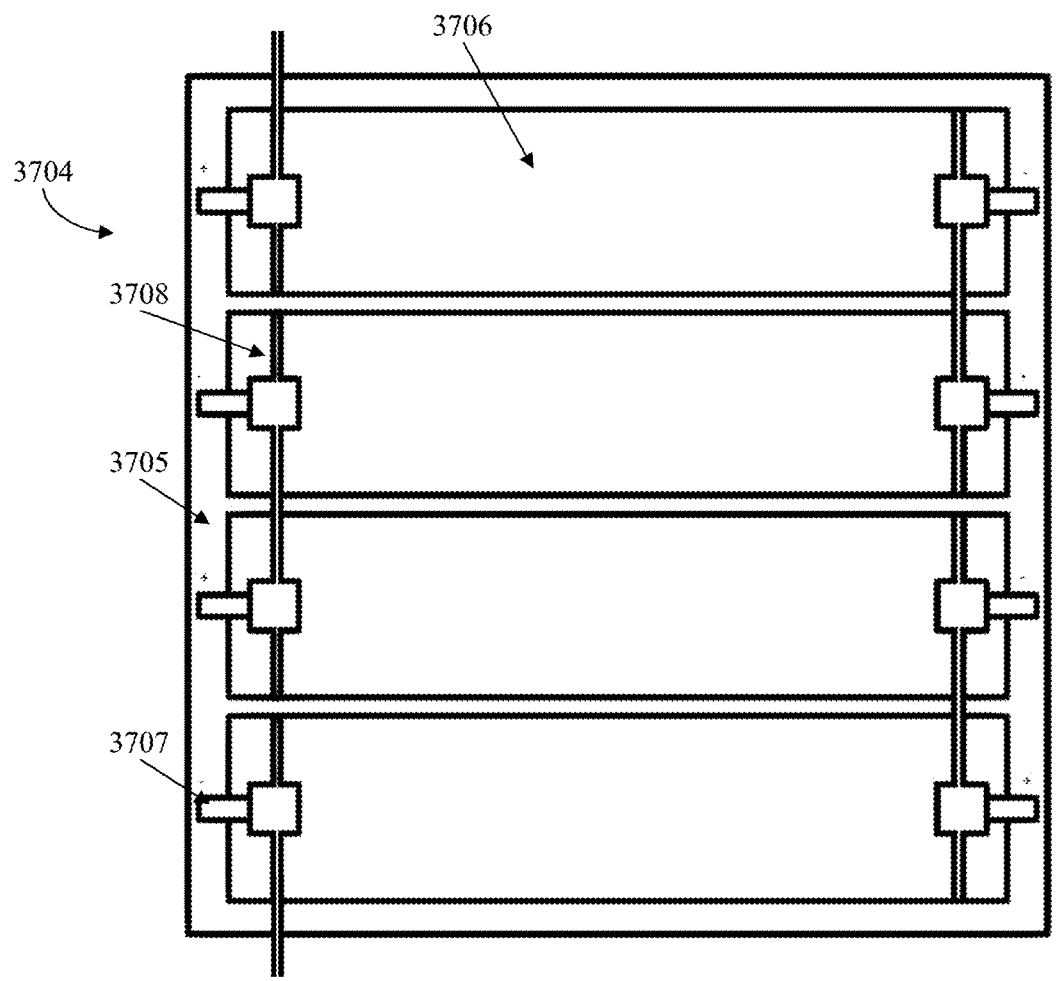
FIG. 37B illustrates a solar cell panel for use in the lamp post of FIG. 37A.
Figure 38:
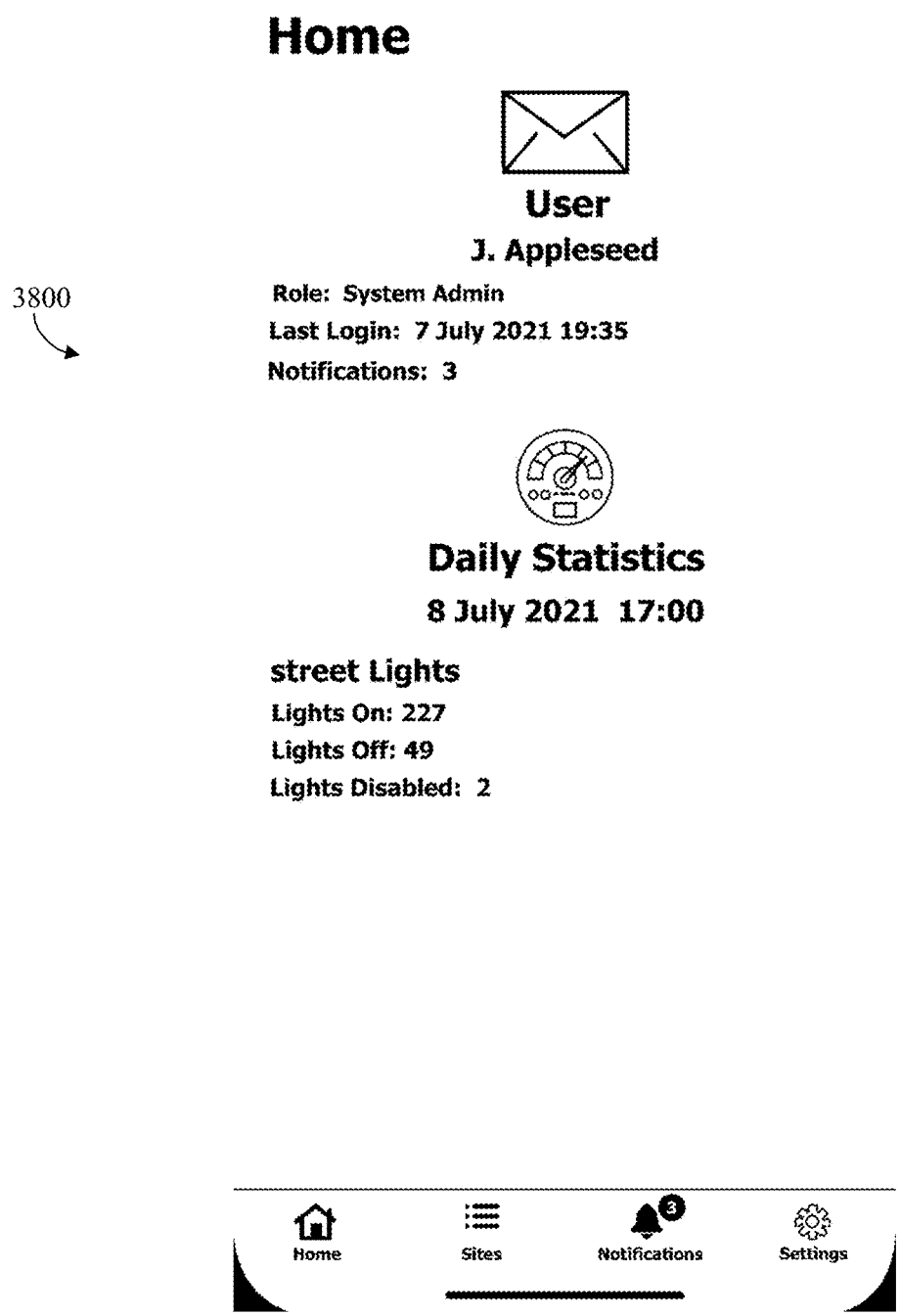
FIG. 38 illustrates a home screen for an application.

FIG. 37B shows a solar cell panel 3704 which makes up part of the outer tube of solar cells 3721 and the inner tube of solar cells 3723. The solar cell panel 3704 features four quarter-sized solar cells 3706 which are disposed on a substrate 3705. The substrate 3705 may allow light through it and may include a cover or treatment to adjust the spectrum of the light for better collection. The quarter-sized solar cells 3706 are connected by conductor ribbons 3708 and include connectors 3707.

As shown in this non-limiting embodiment, the solar cells 1710 are connected in series. In an alternative embodiment, the solar cells 1710 may be connected in parallel.

The graphical user interfaces (GUIs) shown in FIGS. 38-49 illustrate a sample implementation of a client interface.

In some embodiments, the mobile application first presents the user with a Login screen where they enter secure system credentials. Upon successful authentication, the application can present the user with a Home Screen 3800, see FIG. 38, which includes a basic set of overall system health metrics. The application can also present a set of icons (represented in the sample as a bottom tab bar) to allow the user to navigate to other areas of functionality within the application.

Figure 39:
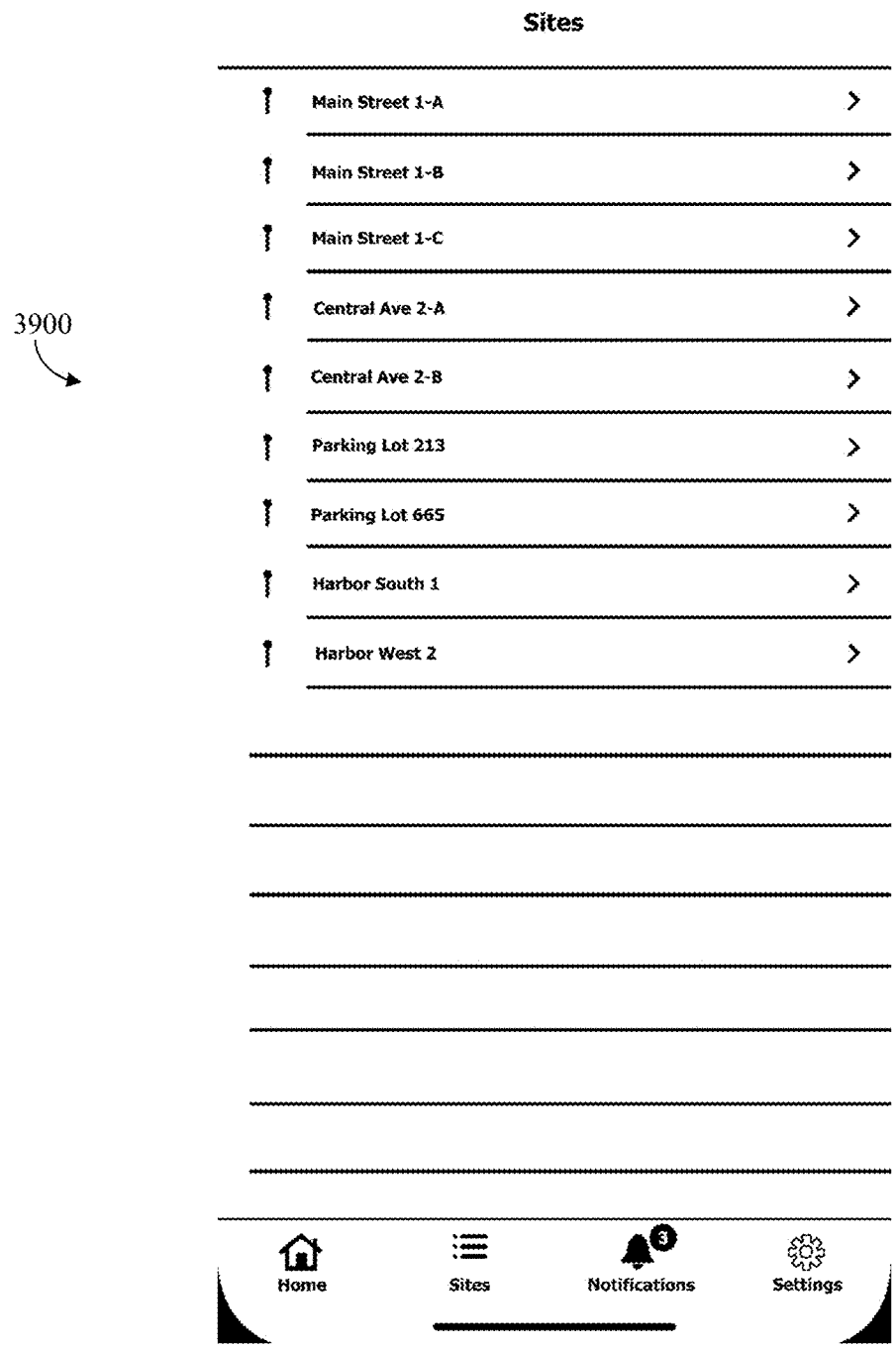
FIG. 39 illustrates a sites screen for the application.
Figure 40:
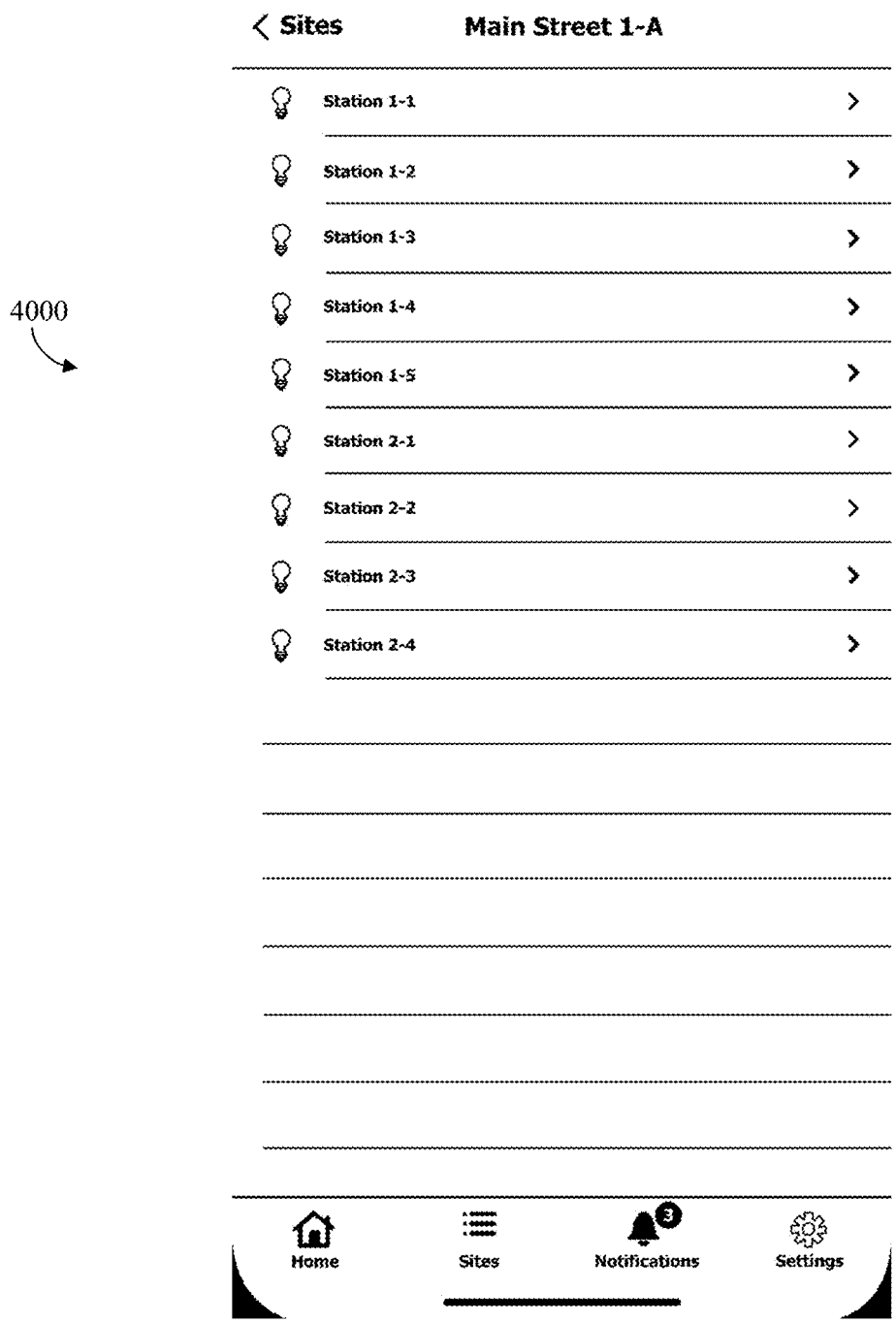
FIG. 40 illustrates a station select screen for one site in the application.

The Sites area, see FIGS. 39-40, shows how the system might permit the user to navigate within the system's logical or geographical hierarchy from the highest level, see Sites screen 3900, down to an individual station, see station select screen 4000. For example, the user might navigate from a city, to a particular city block, to a street, and finally to a particular station. This can be achieved by selecting entries in a series of tables which allow the user to drill down to a station of interest and be presented with a station status screen 4100, see FIG. 41.

Figure 42:
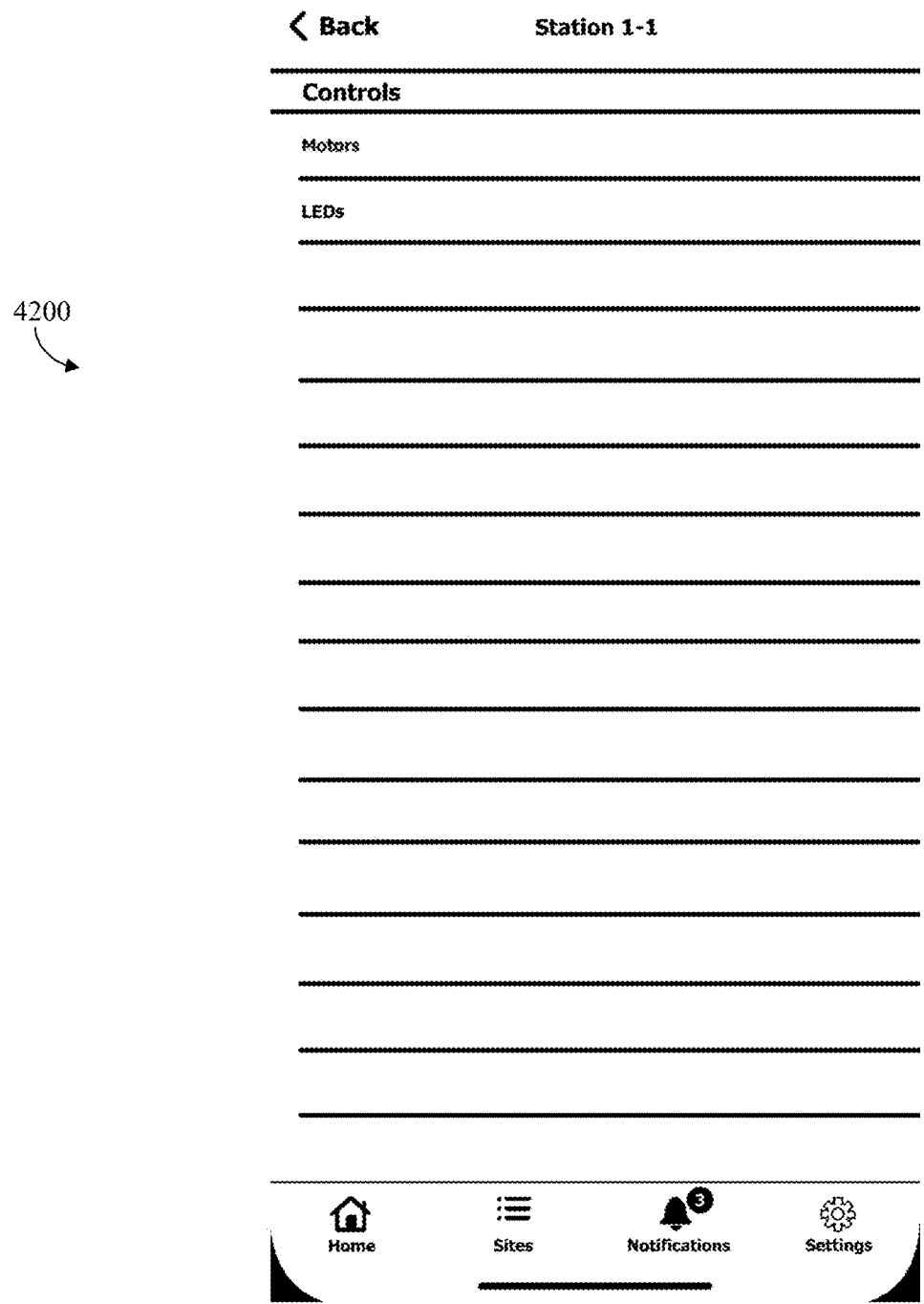
FIG. 42 illustrates a control screen for the application.
Figure 43:
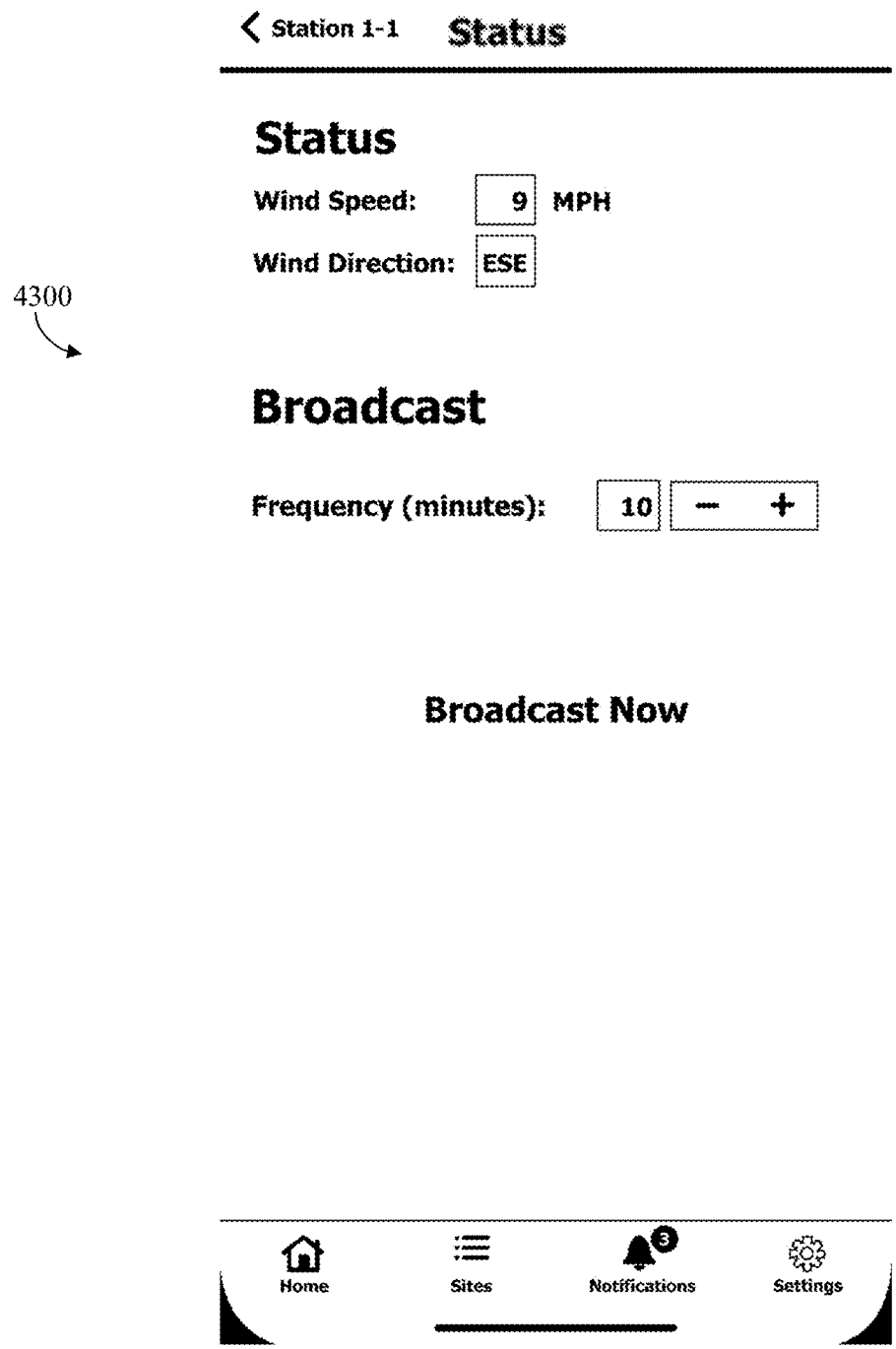
FIG. 43 illustrates a drone guidance status screen for the application.
Figure 44:
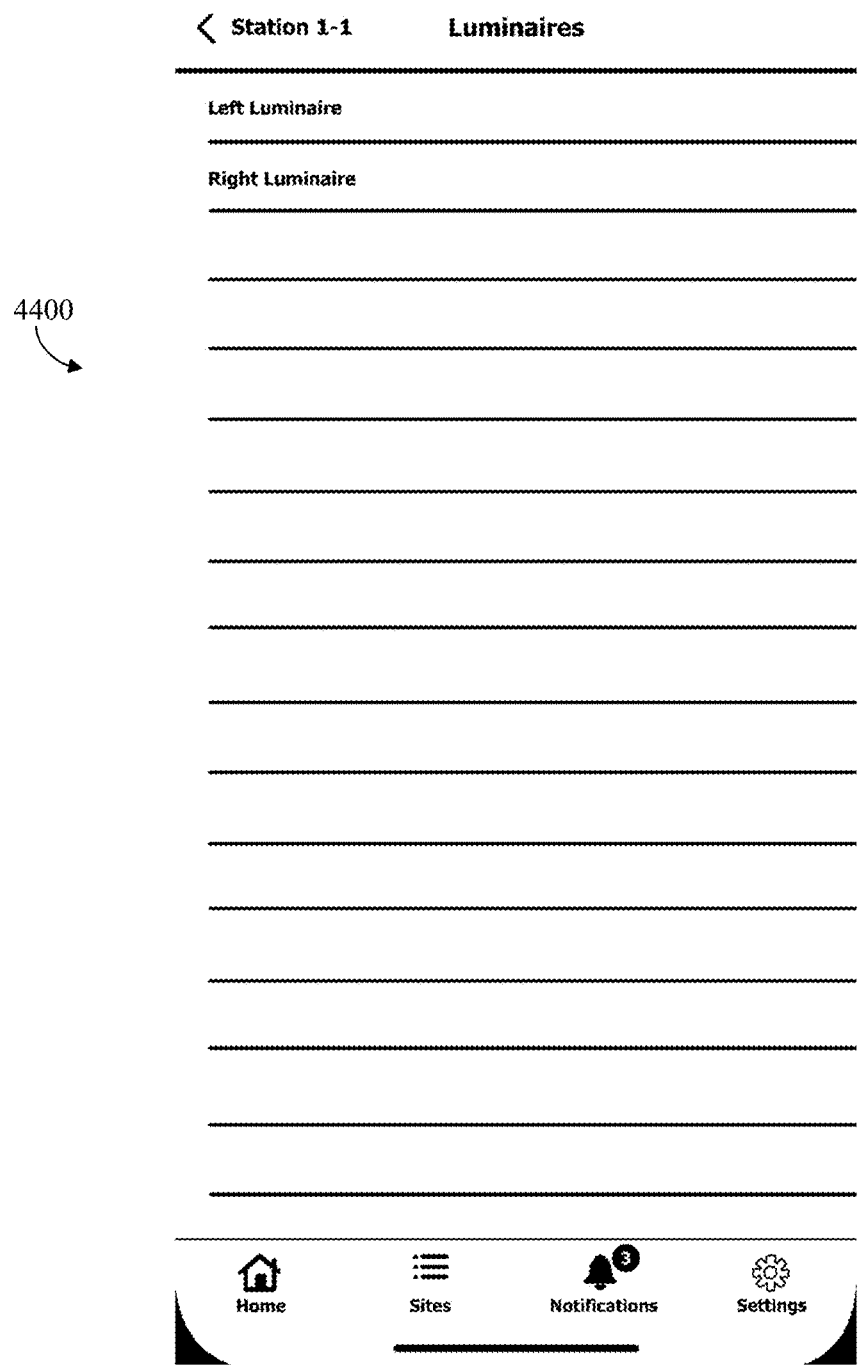
FIG. 44 illustrates a luminaire select screen for the application.
Figure 45:
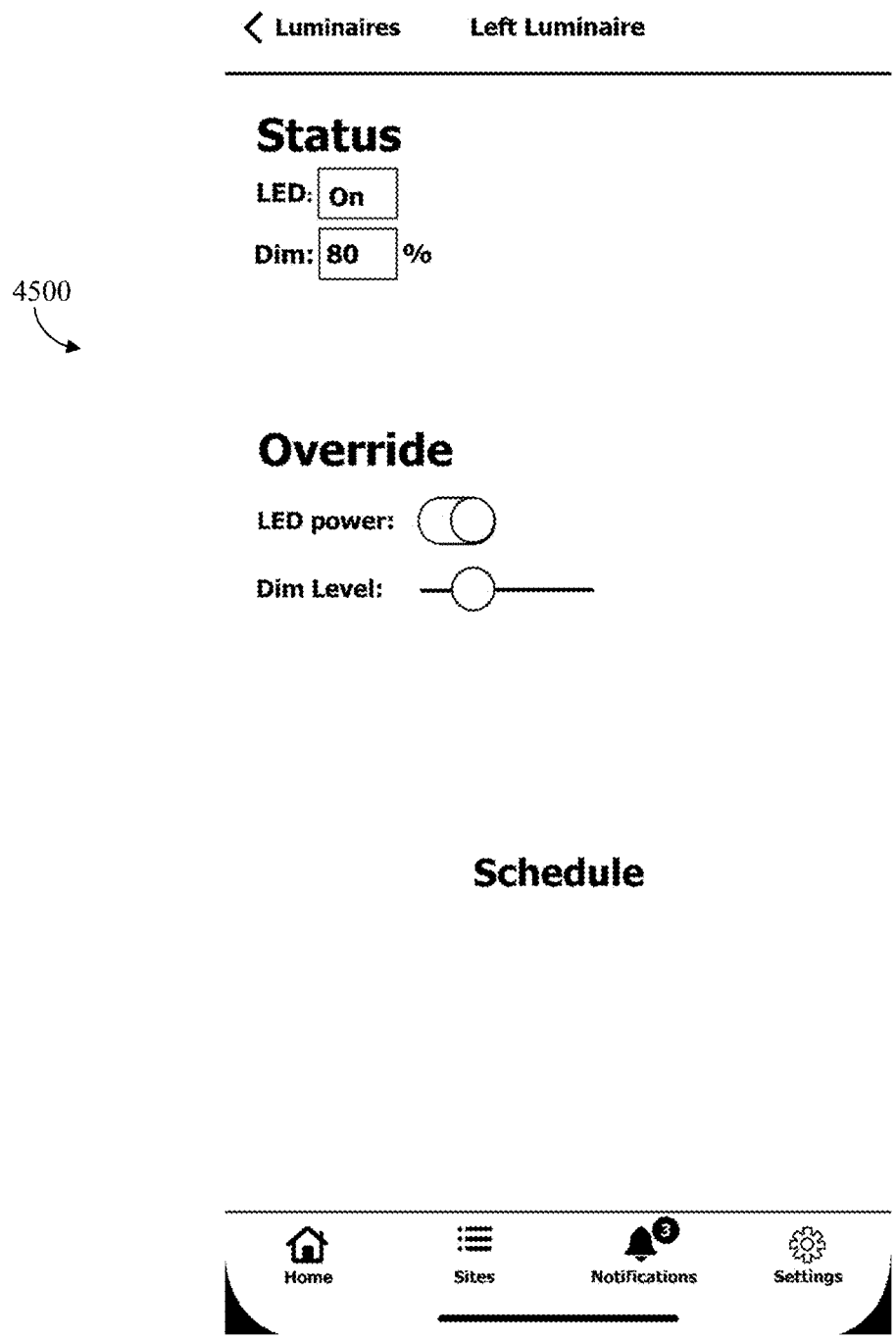
FIG. 45 illustrates a luminaire control screen for the application.
Figure 46:
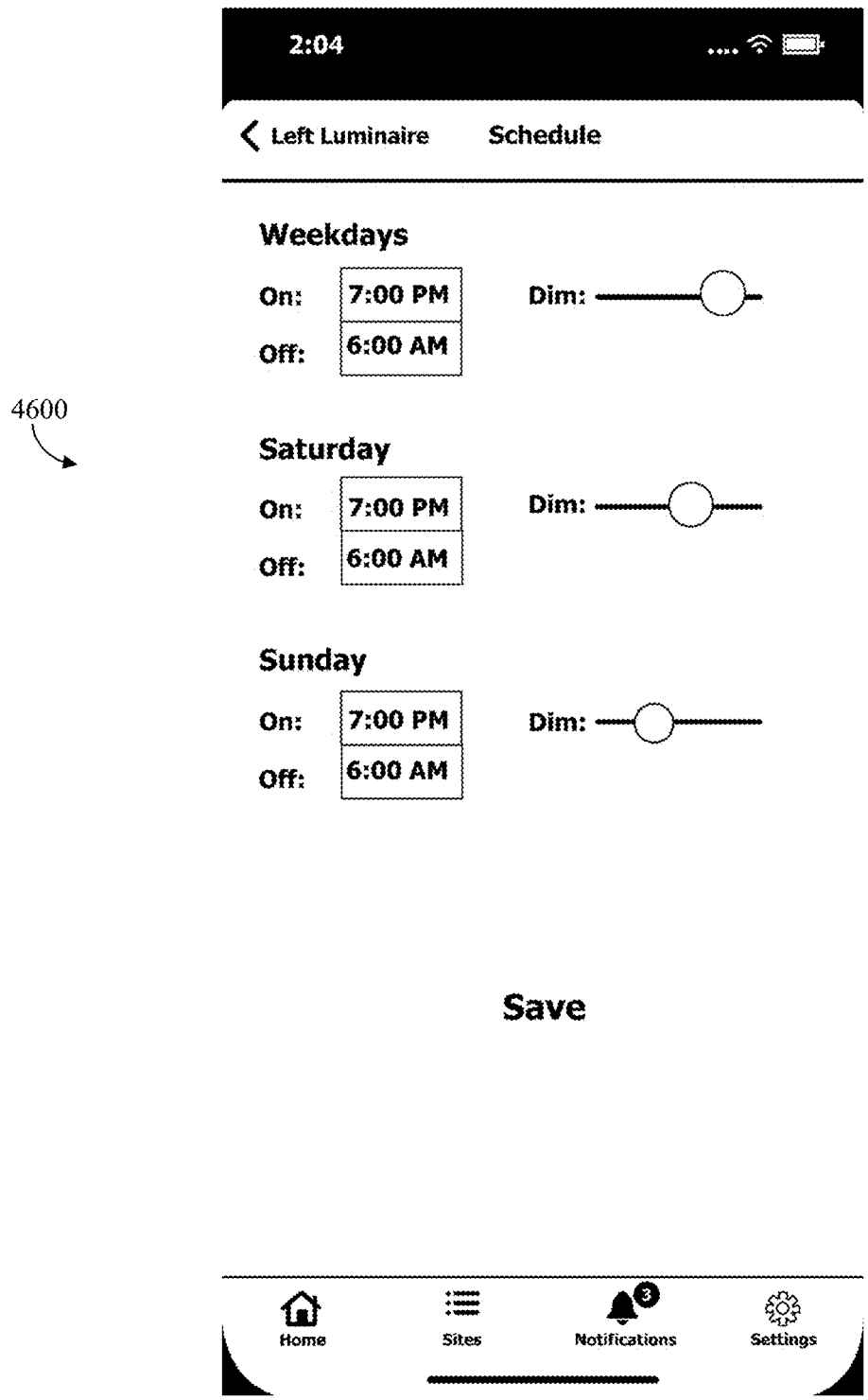
FIG. 46 illustrates a scheduling screen for the application.
Figure 47:
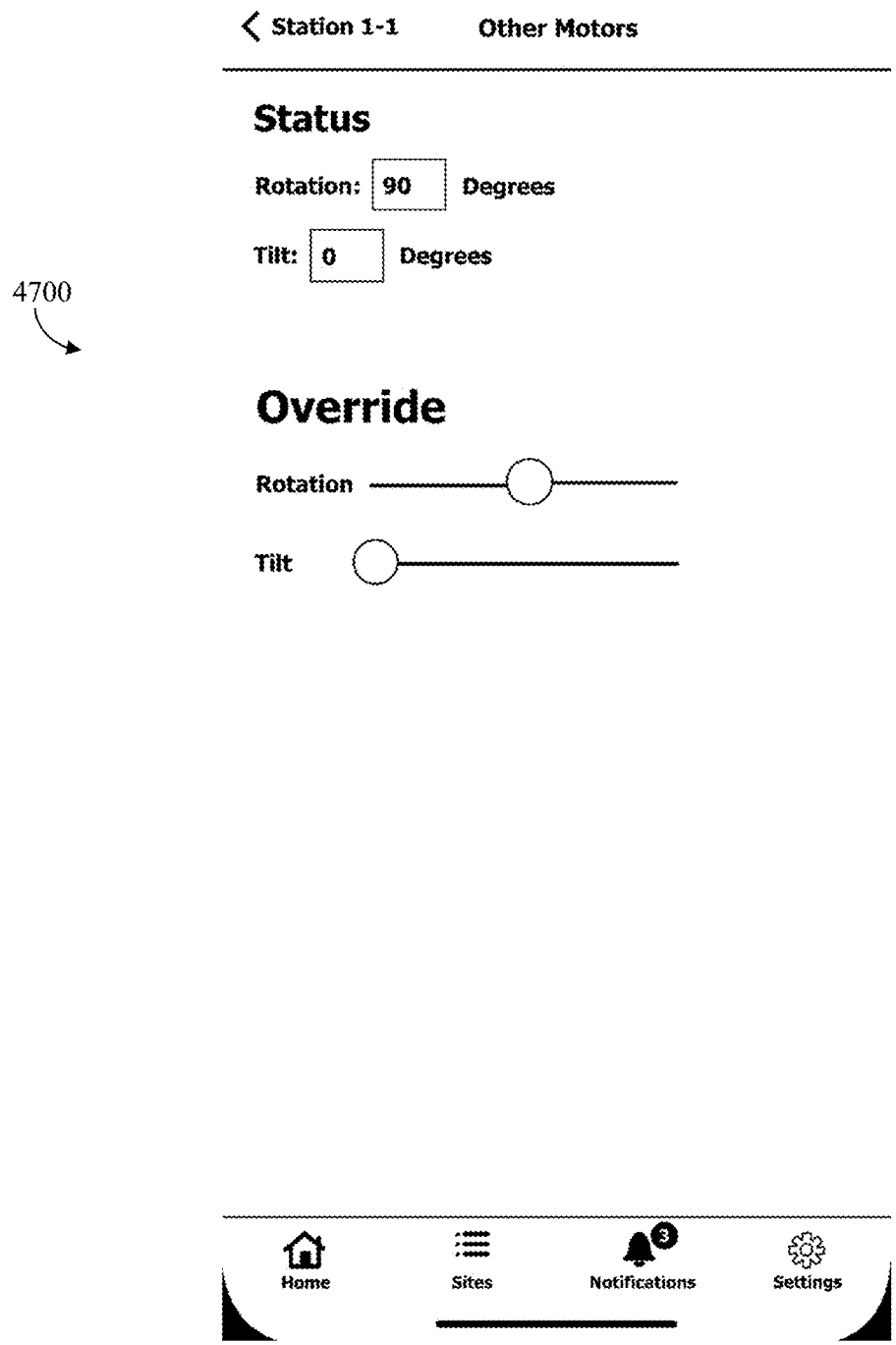
FIG. 47 illustrates a motor control screen for the application.
Figure 48:
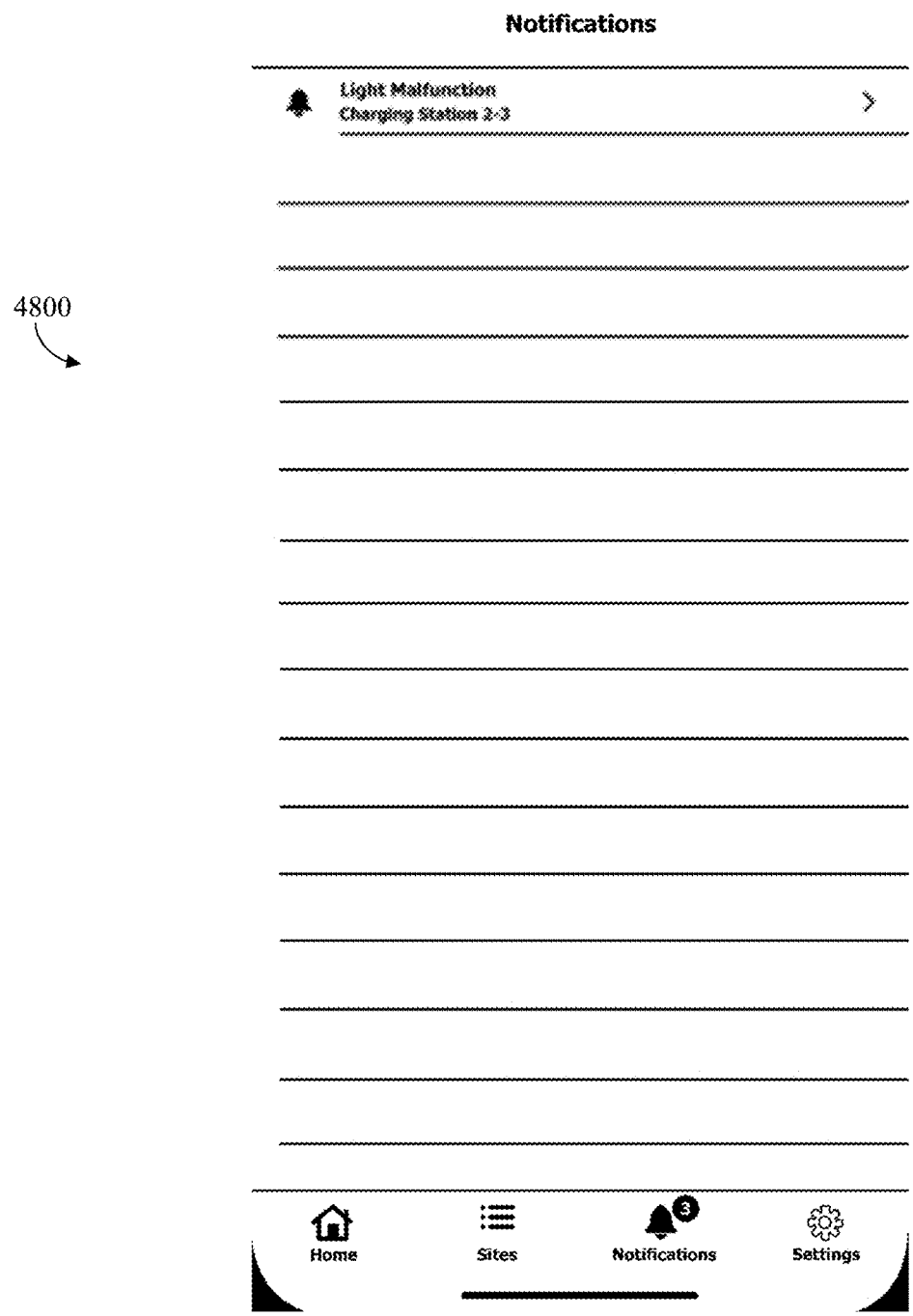
FIG. 48 illustrates a notification screen for the application.
Figure 49:
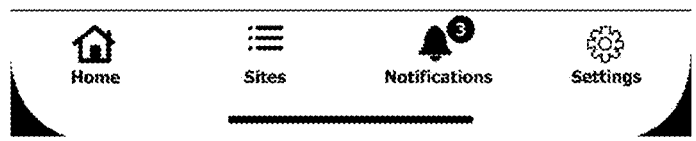
FIG. 49 illustrates a battery charge failure screen for the application.

Once the user has selected a particular system node (station), the application can provide an interface to the various functions of the system Master Controller, see control screen 4200 of FIG. 42. The individual controls might be grouped into functionality areas (Current Conditions, LEDs, etc.), and within the areas the user can view current system status and perform manual overrides.

Current Conditions—On the status screen 4300, the user might observe current environmental conditions such as wind speed and direction. The user might set up a broadcast frequency for the station to inform system subscribers.

LEDs—On luminaire select screen 4400, the user can select specific luminaires and on the luminaire control screen 4500 the user can observe and configure luminaire parameters such as power on/off and dimmer settings for a selected luminaire. The user could also set and override automatic system status changes based on time-of-day and day-of week using the scheduling screen 4600.

In some embodiments, the lamp post may also serve as a streetlight with colored LEDs Other Motors—On the motor control screen 4700, the user can observe the rotation and tilt of the station and manually change these settings.

The Notifications area, shown on the notification screen 4800, illustrates how the system might display system alerts broadcast to all users or a role-based subset of users. In the sample application, selecting an entry in the Notifications table displays further details of the alert condition, see battery charge failure screen 4900. The system might provide controls to perform appropriate remedial actions such as a system reset to a default configuration.

The sample application can also offer the client the ability to modify notification behavior and real-time updating on their specific mobile device. For example, a user who is on-call for system health monitoring might wish to receive audible and haptic signals upon receipt of an alarm condition. Later, when the user's on-call shift ends, they might choose to quiet incoming notifications and simply allow the system to store alarm entries in the Notifications list for later review. The Setting screen can also display troubleshooting information such as application version and build numbers. Finally, the Settings area can offer the user access to application help and support functions.

Various embodiments provide a solar collecting streetlamp. The streetlamp includes a lamp top having solar collectors and one or more light sources. A post is included which supports the lamp top. Disposed around the post is a shell defining an air gap. The shell is configured to supply air from the base of the post to the lamp top.

In a further embodiment of the streetlamp above, the streetlamp includes an air-intake to gather air at ground level and an air supply exhaust to direct the air gathered at ground level into the air gap.

In another embodiment of any one of the streetlamps above, the streetlamp includes a dehumidifier configured to remove moisture from the air gathered at ground level.

In a further embodiment of any one of the streetlamps above, the streetlamp includes a gyromagnetic generator. The air supply exhaust directs air gathered at ground level through the gyromagnetic generator and into the air gap.

In another embodiment of any one of the streetlamps above, the streetlamp includes a tubing coil between the air-intake and the air supply exhaust. The tubing coil may be buried beneath the post or around the post.

In a further embodiment of any one of the streetlamps above, the streetlamp includes an air chamber between the air-intake and the air supply, wherein the air chamber is disposed around at least a portion of the post.

In another embodiment of any one of the streetlamps above, the shell includes an outer layer of solar cells, an inner layer of solar cells and a transparent tube sandwiched between the outer layer of solar cells and the inner layer of solar cells.

In a further embodiment of any one of the streetlamps above, the pole includes inferred lights configured to illuminate the shell. The pole can also include a reflective coating to reflect light onto the shell. The transparent tube may be an acrylic tube.

In another embodiment of any one of the streetlamps above, the light source is a ring of LED lights disposed around the lamp top. The light source may be configured to operate as a traffic signaling light.

An additional embodiment provides a solar collecting streetlamp. The streetlamp includes a lamp top having a plurality of solar collectors and at least one light source and a configured to support the lamp top. The lamp top includes a ring of reflective channels configured to direct light at the plurality of solar collectors.

In a further embodiment of the streetlamp above, the individual reflective channels are one of: square and round.

In another embodiment of any one of the streetlamps above, the ring of reflective channels is further configured to direct light at the post.

In a further embodiment of any one of the streetlamps above, a first subset of reflective channels is configured to direct light at an upper extent of the post and a second subset of reflective channels is configured to direct light at a lower extent of the post.

In another embodiment of any one of the streetlamps above, the lamp top has a reflective fringe configured to direct light at the post. The lamp top can include a reflective support structure configured to hold the plurality of solar collectors and direct light at the solar collectors.

A further embodiment provides a solar collecting streetlamp. The streetlamp includes a lamp top having a plurality of solar collectors and at least one light source. The streetlamp also includes a post configured to support the lamp top, A tilt motor configured to tilt the lamp top and a rotating motor configured to rotate the lamp top.

In another embodiment of the streetlamp above, the solar collecting streetlamp is configured to tilt the lamp top face the sun and/or reduce wind effects. The lamp top may also be shaped to reduce wind effects, for example, to reduce lift.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A solar collecting streetlamp comprising:
a lamp top having a plurality of solar collectors and at least one light source; and
a post configured to support the lamp top having a plurality of solar collectors
wherein the lamp top comprises a ring of reflective channels, each of said reflective channels defining an opening configured to redirect light directed at the lamp top towards the post, wherein the openings in the reflective channels further include a mechanism for focusing light directed therethrough for better absorption by the solar collectors on the post.

2. The solar collecting streetlamp of claim 1, wherein the individual reflective channels are one of: square and round.

3. The solar collecting streetlamp of claim 1, further comprising a battery operatively connecting with the solar collectors on the post configured to store energy collected from said solar collectors.

4. The solar collecting streetlamp of claim 1, wherein the at least one light source includes reflective sides to angle light from the at least one light source for increased illumination therefrom.

5. The solar collecting streetlamp of claim 1, wherein a first subset of reflective channels are configured to direct light towards an upper extent of the post and a second subset of reflective channels are configured to direct light towards a lower extent of the post.

6. The solar collecting streetlamp of claim 5, wherein the opening of at least a portion of the reflective channels is further configured to redirect light upwards.

7. The solar collecting streetlamp of claim 1, wherein the post includes a charging interface.

8. The solar collecting streetlamp of claim 7, wherein the charging interface comprises at least one of a car charger, a cellphone charger, and an electrical outlet.

9. The solar collecting streetlamp of claim 1, wherein the lamp top defines a top portion and the post defines a post portion positioned under the lamp top; and further wherein light directed at the top portion of the lamp top is directed through the openings of the reflective channels and towards the post portion under the lamp top.

10. The solar collecting streetlamp of claim 9, wherein the post portion defines an upper extent and a lower extent; and
wherein a first subset of reflective channels are configured to direct light at the upper extent of the post and a second set of reflective channels are configured to direct light at the lower extent of the post.

11. The solar collecting streetlamp of claim 10, wherein the opening of at least a portion of the reflective channels is further configured to redirect light upwards.

12. The solar collecting streetlamp of claim 1, wherein the lamp top comprises a reflective fringe configured to direct light at the post.

13. The solar collecting streetlamp of claim 12, wherein the lamp top comprises a reflective support structure configured to hold the plurality of solar collectors.

14. The solar collecting streetlamp of claim 12, wherein the lamp top further comprises an LED ring beneath the reflective fringe.

15. The solar collecting streetlamp of claim 14, wherein the reflective fringe is configured to angle light from the LED ring downward.

* * * * *